(12) United States Patent
Mardmöller et al.

(10) Patent No.: US 12,375,426 B2
(45) Date of Patent: Jul. 29, 2025

(54) FRAME DATA PROCESSING

(71) Applicant: Renesas Electronics Corporation., Tokyo (JP)

(72) Inventors: Christian Mardmöller, Dusseldorf (DE); Thorsten Hoffleit, Dusseldorf (DE)

(73) Assignee: Renesas Electronics Corporation, Tokyo (JP)

( * ) Notice: Subject to any disclaimer, the term of this patent is extended or adjusted under 35 U.S.C. 154(b) by 621 days.

(21) Appl. No.: 17/850,107

(22) Filed: Jun. 27, 2022

(65) Prior Publication Data

US 2022/0417178 A1 Dec. 29, 2022

(30) Foreign Application Priority Data

Jun. 29, 2021 (EP) .................................... 21182403

(51) Int. Cl.
*H04L 49/101* (2022.01)
*H04L 49/109* (2022.01)
*H04L 69/22* (2022.01)

(52) U.S. Cl.
CPC .......... *H04L 49/109* (2013.01); *H04L 49/101* (2013.01); *H04L 69/22* (2013.01)

(58) Field of Classification Search
CPC ...... H04L 69/22; H04L 49/101; H04L 49/109
See application file for complete search history.

(56) References Cited

U.S. PATENT DOCUMENTS

2002/0176433 A1 11/2002 Zhu et al.
2019/0288961 A1 9/2019 Kulkarni et al.

FOREIGN PATENT DOCUMENTS

EP 1128609 A2 8/2001

OTHER PUBLICATIONS

Extended European Search Report dated Jan. 4, 2022 received in European Patent Application No. EP 21182403.2.

*Primary Examiner* — Kent Krueger
(74) *Attorney, Agent, or Firm* — SCULLY, SCOTT, MURPHY & PRESSER, P.C.

(57) ABSTRACT

A circuit for use in frame filtering is disclosed. The circuit includes a plurality of comparator units. Each comparator unit configured, in response to receiving at least a part of a data frame, to perform a determination whether data in a portion of the at least part of the data frame matches respective reference data and to provide a result to a comparator unit output based on the determination. The circuit includes a crossbar switch having crossbar inputs coupled to respective comparator unit outputs and configured to provide sets of crossbar switch outputs via configurable interconnects; and a set of result-combining logic units, each result-combining logic unit coupled to a respective set of crossbar switch outputs, and configured to provide a respective logic unit output.

15 Claims, 25 Drawing Sheets

92

| Number | Mode | Value | Description |
|--------|------|-------|-------------|
| 0 | ET | 0x0806 | ARP |
| 1 | ET | 0x0800 | IPv4 |
| 2 | ET | 0x08DD | IPv6 |
| 3 | IP4 | 0x06 | IPv4 TCP |
| 4 | IP6 | 0x11 | IPv6 UDP |
| 5 | -- | -- | -- |
| 6 | -- | -- | -- |
| 7 | -- | -- | -- |
| ... | ... | ... | ... |
| 15 | -- | -- | -- |

| Frame Type | Input_0 | | Input_1 | | |
|---|---|---|---|---|---|
| | PROT [1:0] | TYPE [15:0] | Frame-type filter bit | 4-byte filter | | |
| | | | | Ref value | Mask | Mode |
| NC (802.1AS) | -- | -- | 14th | 01-80-C2-00 | No | Precise |
| ARP | 0 | 0806 | i | FF-FF-FF-FF | No | Precise |
| LLDP | 0 | 88CC | i | 01-80-C2-00 | No | Precise |
| IEEE 1722 | 0 | 22F0 | i | DA[47:16] | No | Precise |
| IPv4 | -- | -- | 13th | DA[47:16] | No | Precise |
| TCP/IPv4 | 1 | XX06 | i | IPv4 address | No | Precise |
| UDP/IPv4 | 1 | XX11 | i | IPv4 address | No | Precise |
| SOME/IPv4 | 1 | XX06 | i | IPv4 address | No | Precise |
| | 1 | XX11 | i | IPv4 address | No | Precise |
| ICMP/IPv4 | 1 | XX01 | i | Dest. IPv4 address | No | Precise |
| IPv6 | -- | -- | 12th | IPv6 address | IPv6 address | Expand |
| TCP/IPv6 | 2 | XX06 | i | IPv6 address | IPv6 address | Expand |
| UDP/IPv6 | 2 | XX11 | i | IPv6 address | IPv6 address | Expand |
| SOME/IPv6 | 2 | XX06 | i | IPv6 address | IPv6 address | Expand |
| | 2 | XX11 | i | IPv6 address | IPv6 address | Expand |
| ICMP/IPv6 | 2 | XX01 | i | Dest. IPv6 address | Dest. IPv6 address | Expand |
| Double tagged | -- | -- | 15th | -- | -- | -- |
| Null Stream Identification for FRER (IEEE 802.1CB) | -- | -- | 15th | DA[47:16] | No | Precise |

Fig. 14A

| Input_2 | | | Input_3 | | |
|---|---|---|---|---|---|
| 2-byte filter | | | 4-byte filter | | |
| Ref value | Mask | Mode | Ref value | Mask | Mode |
| 00-0E | No | Precise | -- | -- | -- |
| FF-FF | No | Precise | -- | -- | -- |
| 00-0X | No | Precise | -- | -- | -- |
| DA[15:0] | No | Precise | StreamID [63:32] | StreamID [31:32] | Expand |
| DA[15:0] | No | Precise | Dest. IPv4 address | Optional | Precise |
| Port | No | Precise | -- | -- | -- |
| Port | No | Precise | -- | -- | -- |
| Port | No | Precise | MessageID | No | Precise |
| Port | No | Precise | MessageID | No | Precise |
| -- | -- | -- | -- | -- | -- |
| -- | -- | -- | IPv6 Address | IPv6 Address | Expand |
| Port | No | Precise | IPv6 Address | IPv6 Address | Expand |
| Port | No | Precise | IPv6 Address | IPv6 Address | Expand |
| Port | No | Precise | IPv6 Address | IPv6 Address | Expand |
| Port | No | Precise | IPv6 Address | IPv6 Address | Expand |
| -- | -- | -- | Dest. IPv6 Address | Dest. IPv6 Address | Dest. IPv6 Address |
| -- | -- | -- | VLAN S Tag | No | Precise |
| DA[15:0] | No | Precise | -- | -- | -- |

Fig. 14B

| Frame Type | Input_4 | | |
|---|---|---|---|
| | 2-byte filter | | |
| | Ref value | Mask | Mode |
| NC (802.1AS) | -- | -- | -- |
| ARP | -- | -- | -- |
| LLDP | -- | -- | -- |
| IEEE 1722 | VLAN C tag | 00-0F | Mask |
| IPv4 | VLAN C tag | 00-0F | Mask |
| TCP/IPv4 | VLAN C tag | 00-0F | Mask |
| UDP/IPv4 | VLAN C tag | 00-0F | Mask |
| SOME/IPv4 | VLAN C tag | 00-0F | Mask |
| | VLAN C tag | 00-0F | Mask |
| ICMP/IPv4 | VLAN C tag | 00-0F | Mask |
| IPv6 | VLAN C tag | 00-0F | Mask |
| TCP/IPv6 | VLAN C tag | 00-0F | Mask |
| UDP/IPv6 | VLAN C tag | 00-0F | Mask |
| SOME/IPv6 | VLAN C tag | 00-0F | Mask |
| | VLAN C tag | 00-0F | Mask |
| ICMP/IPv6 | VLAN C tag | 00-0F | Mask |
| Double tagged | VLAN C tag | 00-0F | Mask |
| Null Stream Identification for FRER (IEEE 802.1CB) | VLAN C tag | 00-0F | Mask |

Fig. 14C

FRAME DATA PROCESSING

CROSS-REFERENCE TO RELATED APPLICATION

This application is based upon and claims priority under 35 U.S.C. § 119 to European Patent Application No. EP 21182403.2, filed on Jun. 29, 2021. The entire disclosure of European Patent Application No. EP 21182403.2 is incorporated herein by reference.

FIELD

The present invention relates to frame data processing, in particular to classifying frame data received from one or more communications networks, for use in frame filtering, and to a frame filtering.

BACKGROUND

Increasingly in automotive and industrial applications, software running on a system-on-a-chip (SoC) or a microcontroller (MCU) use different, dedicated processing paths to exchange data over communications networks, such as Ethernet and controller area network (CAN) networks.

Hardware-implemented filters can be used to check parameters in incoming data received from communication network interfaces to allow a target in the SoC or MCU (such as a CPU) to know what to do with the incoming data. For instance, in Ethernet and CAN frames, such parameters include identifiers (in particular, stream ID or CAN ID), addresses (for example, destination address), message types and higher layer protocol fields (such as IPv4).

Hardware-implemented filters can be implemented in several, different ways.

A memory- or register-based filter can be used to determine whether incoming data matches a filter criterion. A filter criterion may be a pattern (such as a field in a header), a masked pattern, a range or a combination thereof. The filter criterion may take the form of a value stored in memory or register(s) which may be programmed.

A series of filters can be used to process incoming data. Thus, a first filter can be used to perform filtering based on a first criterion, then a second filter can be used to carry out filtering based on a second criterion and so on. This approach is suitable for protocols having a comparatively low event rate, such as CAN, where the interval between events is greater than 100 µs.

Filters, however, can be arranged in parallel using (hardware) registers, Ternary Content Address Memory (TCAM) or hash tables. A parallel approach usually provides a result much faster than a sequential approach and therefore suits protocols with higher event rates, where the interval between events is less than 1 µs, and/or implementations where several data interfaces use the same pool of filters.

Filtering is usually customised for a particular protocol and use case.

For example, in CAN, filtering is mainly done using only media access control layer fields. In Ethernet applications, filtering can also employ only MAC layer fields, but in more sophisticated applications can use higher-level protocols, such as IP protocol.

Use of parallel filter arrangements and deeper forms of filtering comes at a cost. For example, deeper forms of filtering increases complexity of filters in terms of the number of fields used, their variations and depth. Moreover, complex filter arrangements tend to have a large silicon footprint and consume a large amount of power.

SUMMARY

According to a first aspect there is provided a circuit for use in frame filtering. The circuit comprises a plurality of comparator units. Each comparator unit is configured, in response to receiving at least a part of a data frame, to perform a determination whether data in a portion of the data frame matches respective reference data and to provide a result to a comparator unit output based on the determination. The circuit comprises a crossbar switch having crossbar inputs coupled to respective comparator unit outputs and configured to provide sets of crossbar switch outputs via configurable interconnects. The circuit comprises a set of result-combining logic units, each result-combining logic unit coupled to a respective set of crossbar switch outputs and to provide a logic unit output (or "matching output").

The circuit can be used to help classify and, thus, filter frames with greater flexibility, which makes better use of resources, and which is easier to adapt to different applications.

The configurable interconnects may be provided by multiplexers. At least one crossbar input may be configurably (or "re-configurably" or "selectably", for example, programmably) provided to at least two of the result-combining logic units. Thus, a result of a comparison can be used more than once. At least one result-combining logic output may be configurably provided as a crossbar input. Thus, results can be re-used. The plurality of comparator units may comprise a plurality of configurable comparator units operable in at least first and second modes which are selectable, wherein, in the first mode, the data portion is maskable with a mask. The plurality of configurable comparator units may be operable to receive two sets of reference data and to perform the determination using both sets of reference data. The two sets of data may be concatenated. At least some of the plurality of comparator units may be arranged to apply an offset so as to select the portion of the data frame to be used in the determination. At least some of the plurality of comparator units may comprise one or more finite state machines for processing a comparison of the portion of the data with reference data. The comparator units may comprise at least one block comparator unit configured to compare the portion of the data frame with B sets of reference data, where B is a positive non-zero integer which is greater than or equal to 4, for example, between 4 and 32. B may take values of $2^n$ where n is a positive non-zero integer (for example, B may be 4, 8, 16 and 32) for identifying up to B matches and/or $2^n-1$ (for instance, B may be 3, 7, 15 or 31) for identifying up to B–1 matches and a no match. The result-combining logic units may be or include AND gates. The result-combining logic units may be or include OR gates, for instance, to identify presence of one of several matches (such as one of several IP addresses).

The plurality of comparator units may include configurable comparator units (capable of being re-configured), pre-configured comparator units and/or block comparators units. For example, the plurality of comparator units may only include configurable comparator units. Comparator units may be configured to handle data (i.e., perform matching) in different sizes of blocks, such as 2 bytes, 3 bytes or 4 bytes. For each type of comparator unit (e.g., configurable comparator units), there may be a first set of comparator units configured to handle data of a first block size, such as 2 bytes, a second set of comparator units configured to handle data of a second, different block size, such as 3 bytes, and, further optionally, a third set of comparator units configured to handle data of a third, different block size, such as 4 bytes. There may be more configurable comparator units than pre-configured comparator and/or block comparators units.

According to a second aspect there is provided a classifier comprising the circuit of the first aspect and a priority select arranged to receive logic unit outputs from the circuit and to generate a classification number in dependence on the logic unit outputs.

According to a third aspect there is provided a filter comprising the circuit of the first aspect or the classifier of the second aspect, and an actioning unit configured to process frames in dependence on the logic unit outputs and/or the classification number.

According to a fourth aspect there is provided an integrated circuit comprising the classifier of the second aspect or the filter of the third aspect. The integrated circuit is a microcontroller, a system on a chip or an application specific integrated circuit.

According to a fifth aspect there is provided a switch or an end station comprising the classifier of the second aspect or the filter of the third aspect.

According to a sixth aspect there is provided a system comprising a communication gateway comprising the integrated circuit of the fifth aspect, at least one node (such as a module, electronic control unit or other computing node) in communication with the integrated circuit and the filter is arranged to receive frames from the at least one node and to process the frames according to the classification number. A node may be a powertrain module (such as, an engine electronic control unit), a chassis module (such as, a brake-by-wire electronic control unit), a body/comfort module (such as a climate control electronic control unit), a driver assistance module (such as lane-departure control unit), an infotainment module or the like. The integrated circuit may provide a switch or may provide an end station in a communication system.

According to a seventh aspect there is provided a vehicle comprising the system of the sixth aspect which is functionally-integrated into the vehicle. The system may be used to provide communication between computing nodes within the vehicle and/or between a node in the vehicle and a node outside the vehicle (e.g., another vehicle or a node via an external communications network) The vehicle may be motor vehicle. The motor vehicle may be a motorcycle, an automobile (sometimes referred to as a "car"), a minibus, a bus, a truck or lorry. The motor vehicle may be powered by an internal combustion engine, one or more electric motors or both (i.e., "hybrid"). The vehicle may be an aircraft (or other airborne vehicle), a train, a ship (or other watercraft) or spacecraft.

According to an eighth aspect there is provided a method comprising receiving at least a part of a data frame, for plural sets of reference data, performing a determination whether data in a portion of the at least part of the data frame matches reference data and to provide a result based on the determination, selecting groups of results and processing a group results using a result-combining logic unit to obtain a logic unit output.

The method may further comprise generating a classification number in dependence on the logic unit outputs. The method may further comprise processing frames in dependence on the logic unit outputs and/or the classification number.

BRIEF DESCRIPTION OF THE DRAWINGS

Certain embodiments will now be described, by way of example, with reference to the accompanying drawings, in which:

FIG. 14A shows a portion of the table of FIG. 14 in more detail;

FIG. 14B shows another portion of the table of FIG. 14 in more detail;

FIG. 14C shows another portion of the table of FIG. 14 in more detail;

DETAILED DESCRIPTION

AVB Receive Classification

Figure 1:
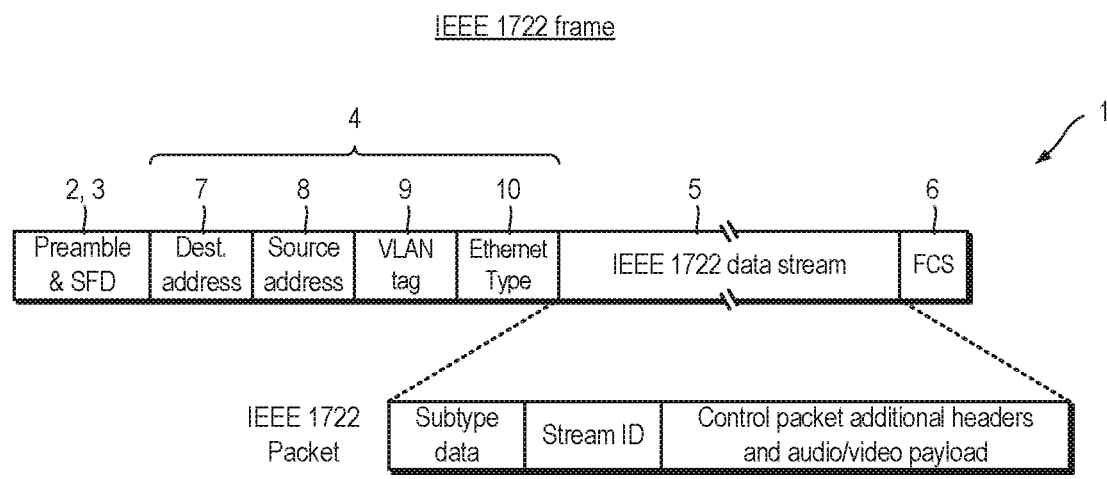
FIG. 1 illustrates an IEEE 1722 frame.
Figure 2:
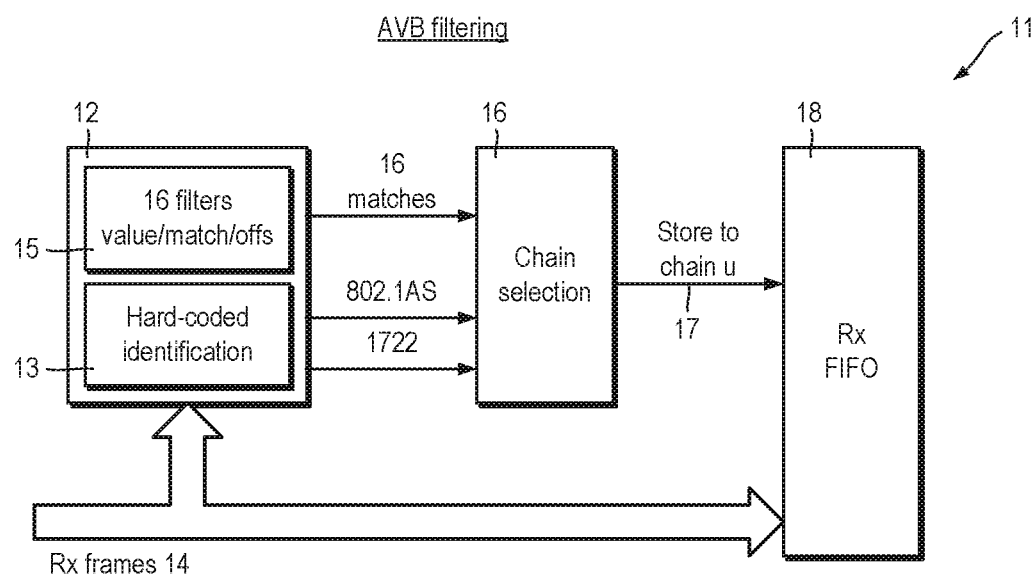
FIG. 2 illustrates data flow in AVB filtering.

Referring to FIGS. 1 and 2, an IEEE 1722 frame 1 and a filter arrangement 11 for filtering frames received by a message handler in an Audio Video Bridging (AVB) end station are shown.

The IEEE 1722 frame 1 includes a preamble 2, a start of frame (SFD) 3, an Ethernet header 4, a payload 5 and a frame check sequence (FCS) 6. The IEEE 1722 frame header 4 consists of a destination address 7, a source address 8, a VLAN tag 9 and Ethernet Type 10.

Filters 12 includes a frame-type identification block 13 which can inspect the destination address, VLAN tag and EtherType fields of a frame to determine whether a frame 14 received from the media access controller (MAC) (not shown) is an IEEE 1722 frame 1 and whether it is compliant with IEEE 802.1AS. The filters 12 can include up to 16 other filters 15 for identifying, for instance, frames with given MAC addresses. Once frames have been identified, a chain selection block 16 selects a corresponding chain. A chain identifier 17 and the frame 1 are passed to a direct memory access controller (DMAC) 18 for storing in the appropriate queue in system memory (not shown).

Different applications (i.e., different use cases) may require different filters and follow different approaches to classification. For example, in one application, a user may want to filter frames based on MAC address, VLAN and some (OSI) level 4 data, while in another, different application, a user may want to filter frames based on IP address and port numbers.

The AVB filter 11 hereinbefore described can only be used for filtering 1722 AVB frames, and is based on stream ID. If different filtering is required, for example, based on IPv4 or IPv6 addresses or deep-package inspection, then different filters are needed.

One way in which this can be achieved is to provide a full set of filters which cover a full range of applications from which users can choose filters of interest. This, however, increases the size of the silicon footprint needed for filters as well as the number of bits used for configuring the filters.

Figure 3:
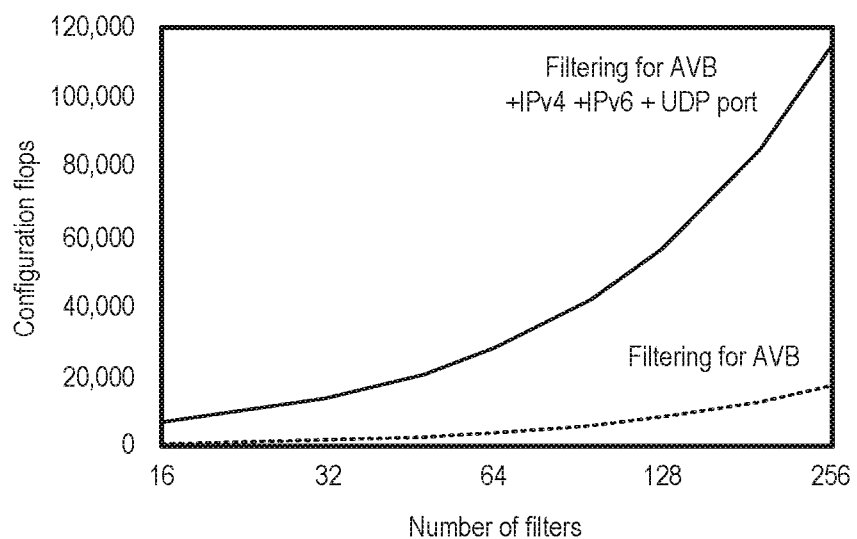
FIG. 3 shows plots of configuration flops as a function of number of filters for a first, simpler filtering process and a second, more complex filtering process.

Referring to FIG. 3, for a relatively simple AVB filter 11, as the number of filters increase, the number of configuration flops increases. For a more complex filter, the number of configuration flops increases significantly with the number of filters.

Flexible, Configurable Frame Filtering

Figure 4:
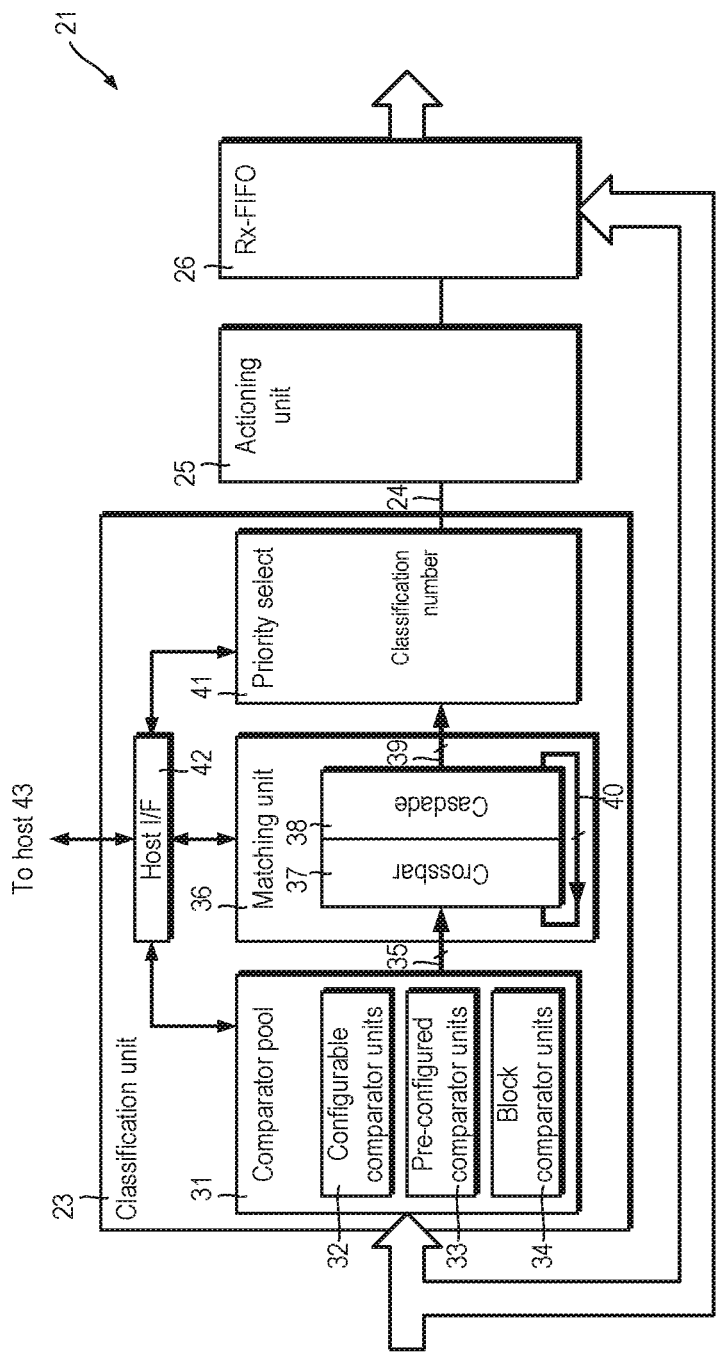
FIG. 4 illustrates data flow in a frame filter.

Referring to FIG. 4, a filter arrangement 21 (herein also referred to simply as "filter") is shown which is flexible and configurable according to application.

The filter 21 can provide and/or enable flexible frame identification, flexible filter offset, multiple filter positions, flexible DMA chain mapping and/or filter results to be re-used.

Instead of using hard-coded identification, the filter 21 is configurable. The filter 21 can check one or more selectable parts of a received frame 22. The filter 21 can perform identification distributed across an OSI-layer header (e.g., for UDP, Ethernet Type, IPv4 Address, UDP Protocol type, UDP port, and application-specific IDs in UDP payload) and multiple positions within a frame. In cases where frame identification is based only on, for example, UDP port number, filter results can be re-used and so fewer hardware resource are needed.

Referring to FIG. 4, the filter 21 comprises a classification unit 23 for identifying whether a part (or parts) of a frame 22 matches a pre-defined criterion (or corresponding criteria) and outputting a result 24 in the form a classification number 24. The classification number 24 is passed to an actioning unit 25 which determines how the frame 22 should be processed based on the classification number 24.

While classification is performed, the frame 22 can be stored in memory 26, such as a first-in, first-out (FIFO) buffer.

The classification unit 23 includes a pool 31 (or "set" or "bank") of comparators. The comparator pool 31 can include a set of configurable comparator units 32, a set of pre-configured comparator units 33 and/or a set of block comparators units 34.

The comparator pool 31 may only include only one type of comparator unit, such as configurable comparator units 32.

The comparator pool 31 may include comparator units 32, 33, 34 which are used to process data of different sizes, such as 2 bytes ("2-byte filters"), 3 bytes ("3-byte filters") and/or 4 bytes ("4-byte filters"). For example, the comparator pool 31 may include sixty-four 2-byte configurable comparator units 32, sixty-four 3-byte configurable comparator units 32 and sixty-four 4-byte configurable comparator units 32. There may be, however, fewer or more comparator units 32 of each size.

The comparator pool 31 may include configurable comparator units 32, pre-configured comparator units 33 and a set of block comparators units 34. For example, there may be sixty-four configurable comparator units 32 for each filter size, two pre-configured comparator units 33 (optionally, two for each filter size) and one or two block comparators units 34 (optionally, one or two for each filter size).

As will be explained in more detail later, a pre-configured comparator units 33 and a block comparators unit 34 are generally simpler versions of the configurable comparator unit 32, i.e., generally containing less hardware logic, but the hardware logic is optimised for particular situations. For example, pre-configured comparator units 33 are intended to be employed for filtering commonly-used fields, such as EtherType. Block comparators units 34 are intended for filtering a limited number of fields (for example, only one field) which can have many values (such as up to 16 values), for instance, for use in AVB.

Referring still to FIG. 4, the classification unit 23 includes a matching unit 36 for processing outputs 35 of the comparator units 32, 33, 34. The matching unit 36 includes a crossbar unit 37 (herein also referred to as a "crossbar block", "crossbar switch" or simply "crossbar") and a cascade unit 38 (herein also referred to as a "cascade block" or simply "cascade"). As will be explained in more detail later, the crossbar 37 and cascade 38 are programmable and can be used to identify specific combinations of data. Furthermore, at least some of results 40 from the cascade 38 can be re-used by the crossbar 37.

The classification unit 23 includes a priority select block 41 (or "priority select unit") which processes the results 39 from the matching unit 36 and outputs the classification number 24.

The classification unit 23 includes an interface 42 to a host 43. The host 43 can program configuration registers 62 (FIG. 5) which are used to configure the comparator units 32, 33, 34, configuration registers 125 (FIG. 16) which are used to configure the crossbar 37 and cascade 38, and configuration registers 132 (FIG. 16) which are used to configure the priority select block 41.

Comparator Units—Introduction

Figure 5:
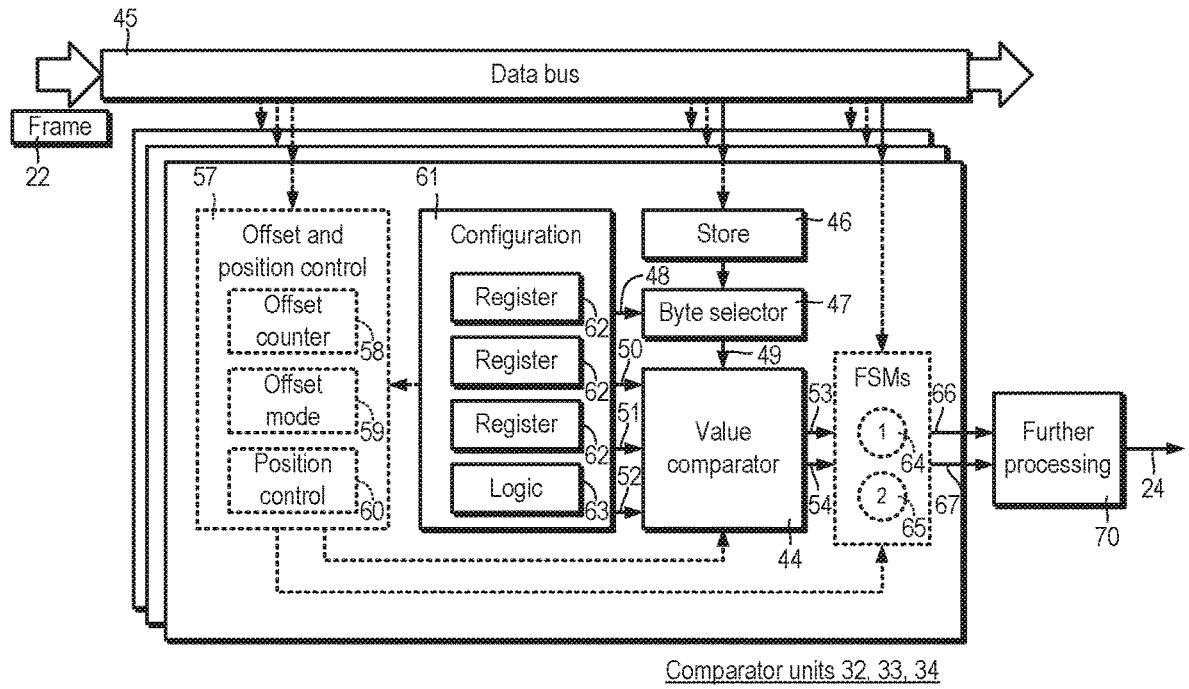
FIG. 5 is a schematic block diagram of a configurable comparator unit which includes a value comparator and at least one finite state machine (FSM)

Referring to FIG. 5, comparator units 32, 33, 34 are built around a value comparator 44. Incoming frames 22 are received from a data bus 45 via a data store 46 and byte selector 47 which, based on an offset 48, selects data 49 for comparison using first and second values 50, 51 according to a mode 52 and outputs first and second outputs 53, 54 indicating matches ("Match 1" and "Match 2").

A comparator unit 32, 33, 34 may include offset and position control unit 57 which comprises an offset counter 58, offset mode 59 and position control 60. Offsets are described in more detail hereinafter.

A comparator unit 32, 33, 35 includes a configuration unit 61 which includes a set of configuration registers 62 and configuration logic 63 for configuring the value comparator 44, the byte selector 54 and the offset and position control unit 57.

A comparator unit 32, 33, 35 may include one or more finite state machines (FSMs) 64, 65 which can process the outputs 53, 54 of the value comparator 44.

The outputs 66, 67 of the FSMs 64, 65 or the output 53, 54 of the value comparator 44 are output to circuitry 70 for further processing. The circuitry 70 includes the matching unit 36 and the priority select unit 41.

Figure 6:
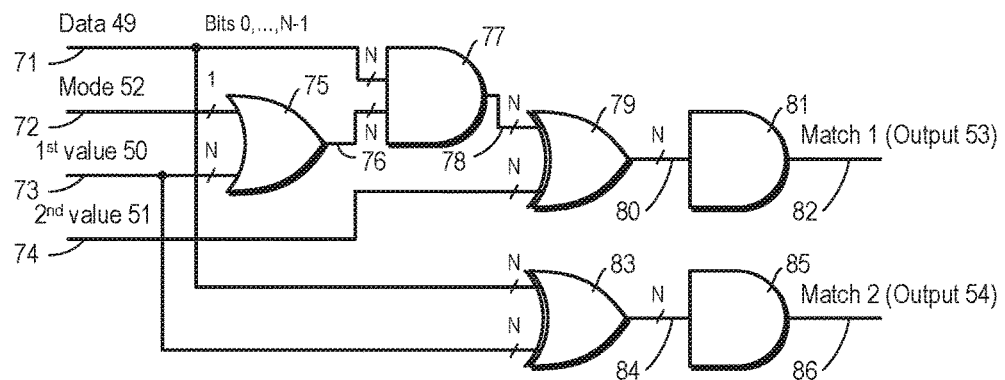
FIG. 6 is a schematic circuit diagram of a configurable comparator unit.

Referring to FIG. 6, a value comparator 44 receives n bits of data 49 from the frame 22 (FIG. 5) on a first line 71 ("data line"), a mode 52 on a second line 72 ("mode line"), a first n-bit value 50 on a first line 73 ("first value line") and a second n-bit value 51 on a second line 71 ("second value line").

As will be explained hereinafter in more detail, the first value 50 can serve as a mask or a filter value ("a first filter value" or "first reference"), and the second value 51 can serve a filter value ("a second filter value" or "second reference").

The mode 52 and the first value 50 are fed, via the mode line 72 and the first value line 73, as inputs to a bitwise OR gate 75 (in the form of n 2-input OR gates). The n-bit wide output of the bitwise OR gate is passed, via line 76, to a bitwise AND gate 77 (in the form of n 2-input AND gates) which also receives data 49 via the data line 71.

The output of the bitwise AND gate 77 is passed, via line 78, as one of the inputs to a first bitwise XOR gate 79 (in the form of n 2-input XOR gates) which also receives, as its other input, the second value 51 received on the second value line 74. The n-bit wide output of the first bitwise XOR gate 79 is output via line 80 to a first n-input AND gate 81. The single-bit output of the first n-input AND gate 81 is output as a first value comparator output 53 via line 82.

Data 49 and the first value 50 are fed as inputs to a second bitwise XOR gate 83 (again in the form of N 2-input XOR gates). The n-bit wide output of the second bitwise XOR gate 83 is output via line 84 to second n-input AND gate 85. The single-bit output of the second n-input AND gate 85 is output as a second value comparator output 54 via line 86. The bitwise XOR gates 79, 83 are also referred to herein as "comparators".

As mentioned earlier, the comparator units 32, 33, 34 may be arranged to receive and process data in 2-byte (16-bit) blocks, 3-byte (24-bit) blocks or 4-byte (32-bit) blocks.

Figure 7:
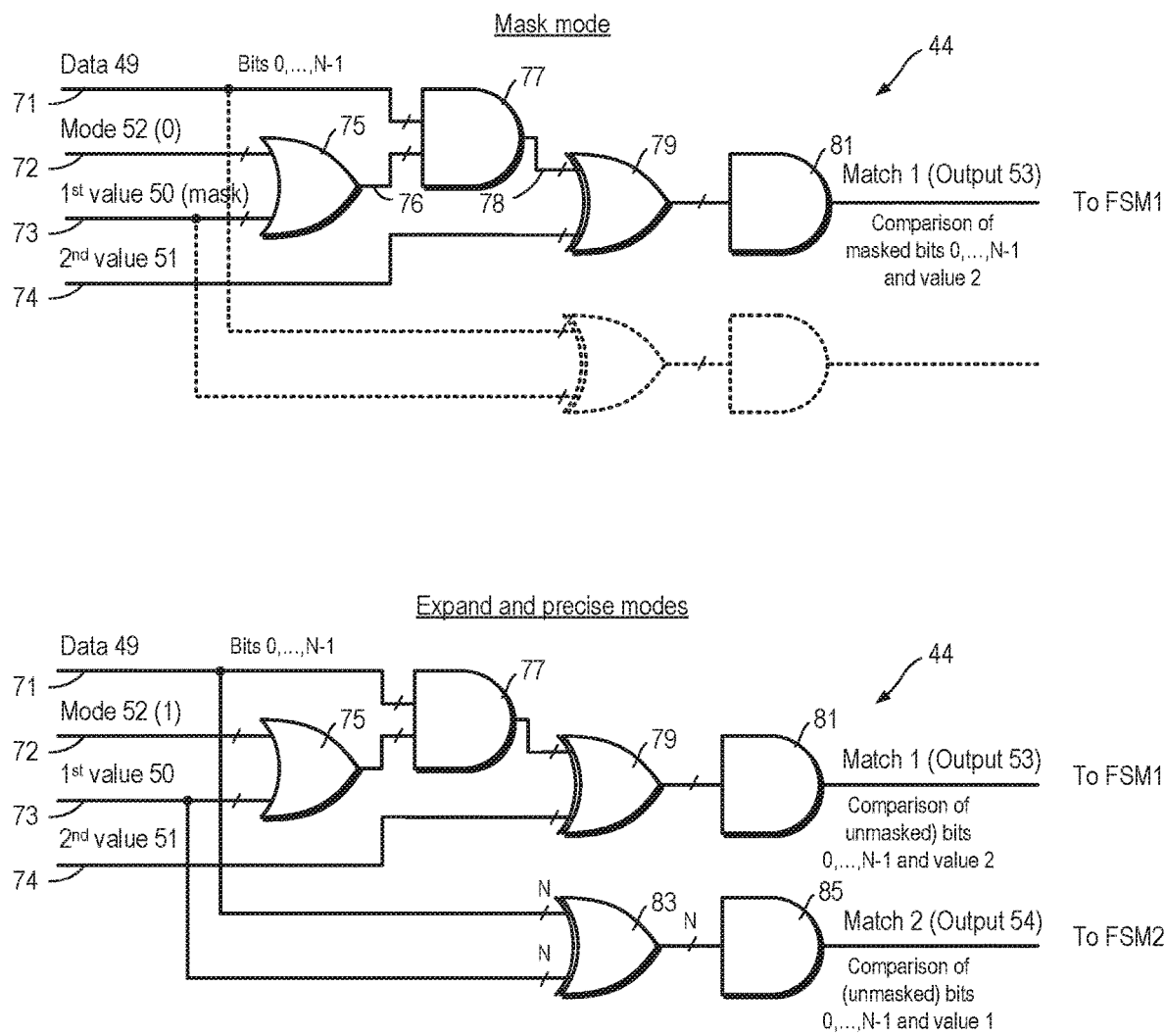
FIG. 7 shows three modes of operating a configurable comparator unit.

Referring also to FIG. 7, in a so-called "mask mode", the first value 50 is used as a mask and the second value 51 serves as the value to be matched ("reference"). The mask 50 is used to mask individual bits so that the comparator 79 only compares unmasked bits of the input data 49 and the reference 51.

In a so-called "expand mode", the first and second filter values 50, 51 can be concatenated to create a double-width filter, i.e., 2n bits wide. Alternatively, in a so-called "precise mode", each of the first and second filter values 50, 51 are each used as an n-bit reference. Herein, modes are handled in part by the value comparator 44 and in part by the FSMs 64, 65. In some embodiments, however, different modes can be implemented in a value comparator 44 using multiplexers (not shown).

A pre-configured comparator unit 33 is similar to a configurable comparator unit 32. It may differ, however, in that some of the values 50, 51 are fixed. The values 50, 51 may be hardwired at time of manufacture or be one-time programmable. Thus, the pre-configured comparator units 33 may be identical to the configurable comparator units 32 except that re-programming of values is disabled.

Figure 8:
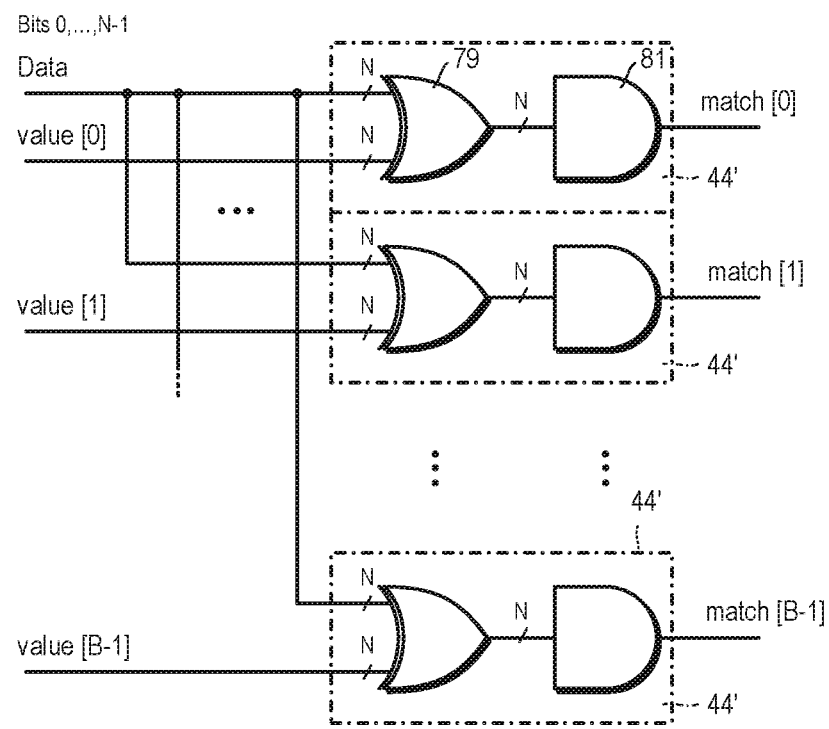
FIG. 8 illustrates a block comparator.

Referring to FIG. 8, a block comparator 34 may comprise a set of B simplified value comparators 44', where B is a positive, non-zero integer, for example between 8 and 16. Each simplified value comparators 44' comprises a bitwise XOR gate 79 and an AND gate 81. The same n-bit data is supplied to each of the B simplified value comparators 44' and each simplified value comparators 44' compares the data with a respective n-bit value, namely value [0], value [1], . . . , value [B−1]. In some cases, one or more of the values may be fixed and not configurable. The arrangement can be useful for routing applications.

Block comparator units 34, while less flexible, are simpler and thus cheaper to implement. Using filter modes (for example, mask, precise and expand modes) can help reduce the amount of processing power ("flops") needed to configure fully the classification unit 24 (FIG. 4). Using block comparator units 34 (for example, 16 values on 1 offset/mask) can help reduce the area of classification unit 23. Also, using comparator units 34 (for example, groups of four filters) which share the same offset can also help to reduce the area consumed by the offset selectors.

Figure 9:
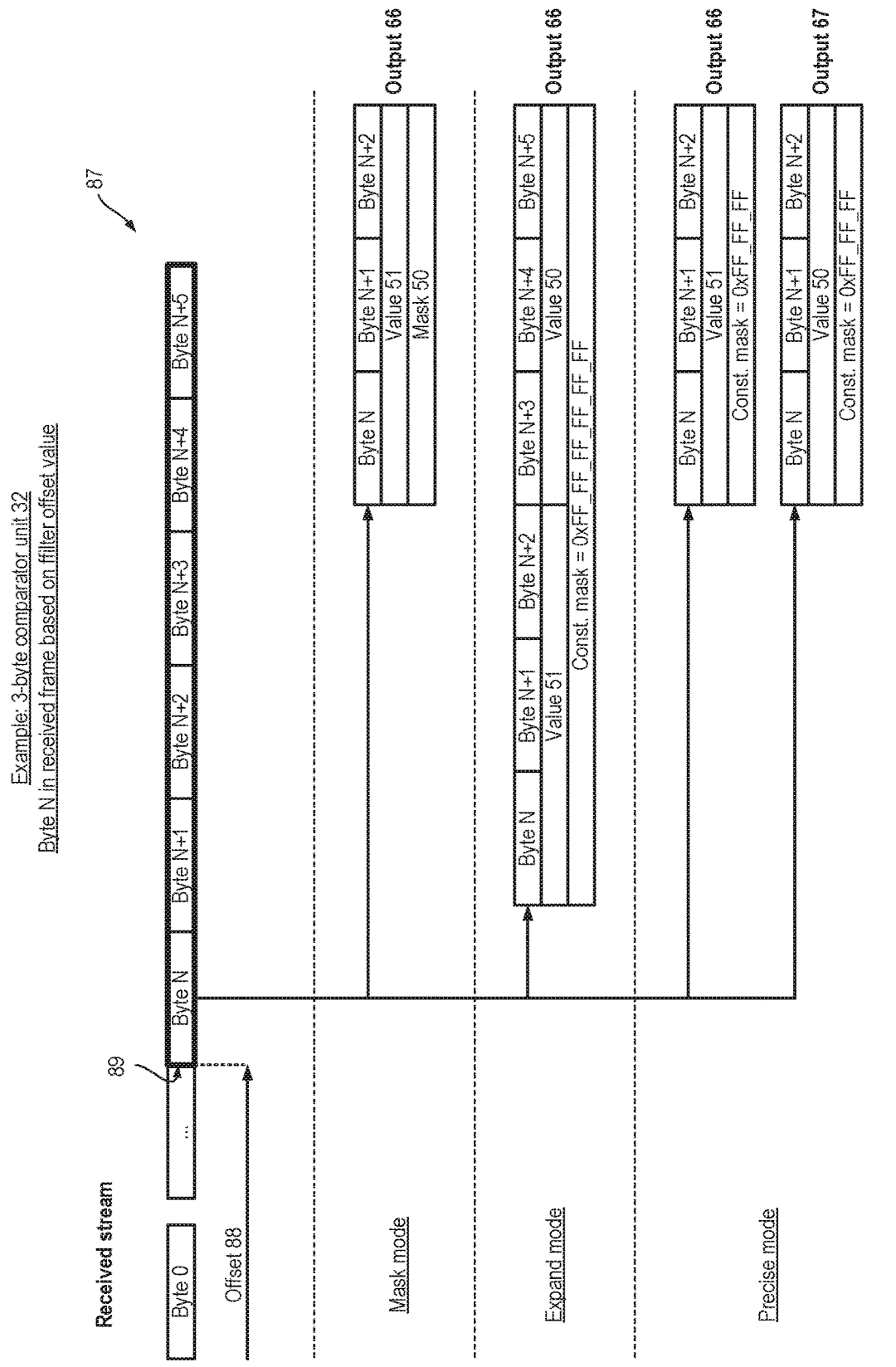
FIG. 9 shows three modes of operating a filter in more detail.

FIG. 9 illustrates processing of stream of data 87 in a frame 22 (FIG. 5) which starts from byte 0 and includes bytes N, N+1, . . . , N+5 by a configurable comparator unit 32 having a width of 3-bytes.

Referring to FIGS. 7 and 9, an offset 88 is used to select the start 89 of the data 87 to be processed, which in this case is byte N.

In mask mode, three bytes of data N, N+1 and N+2 are masked using stored mask provided by the first value 50 and compared with reference data provided by the second value 51 by the first comparator 79.

In expand mode, six bytes of data N, N+1, N+2, N+3, N+4, N+5 are left unmasked and compared with concatenated data provided by first and second values 50, 51 by first and second comparators 79, 83.

In precise mode, the first three bytes of data N, N+1, N+2 are left unmasked and compared with data provided by a first value 50 by the first comparator 79. The second three bytes of data N+3, N+4, N+5 are also left unmasked and compared with a second value 51 by the second comparator 83.

Further details of the value comparator 44 and how the mode is set will be described in more detail hereinafter.

Offset (General)

The classification unit 23 is able to check an individual part or individual parts of a frame by using an offset or offsets. The relevant parts of the frame vary between protocols and it may be desirable to use different protocols in parallel and, thus, check different parts of the frame in parallel.

Before explaining how offsets are used, some examples of different communication protocols and example of which parts of a frame may be of interest will described.

Figure 10:
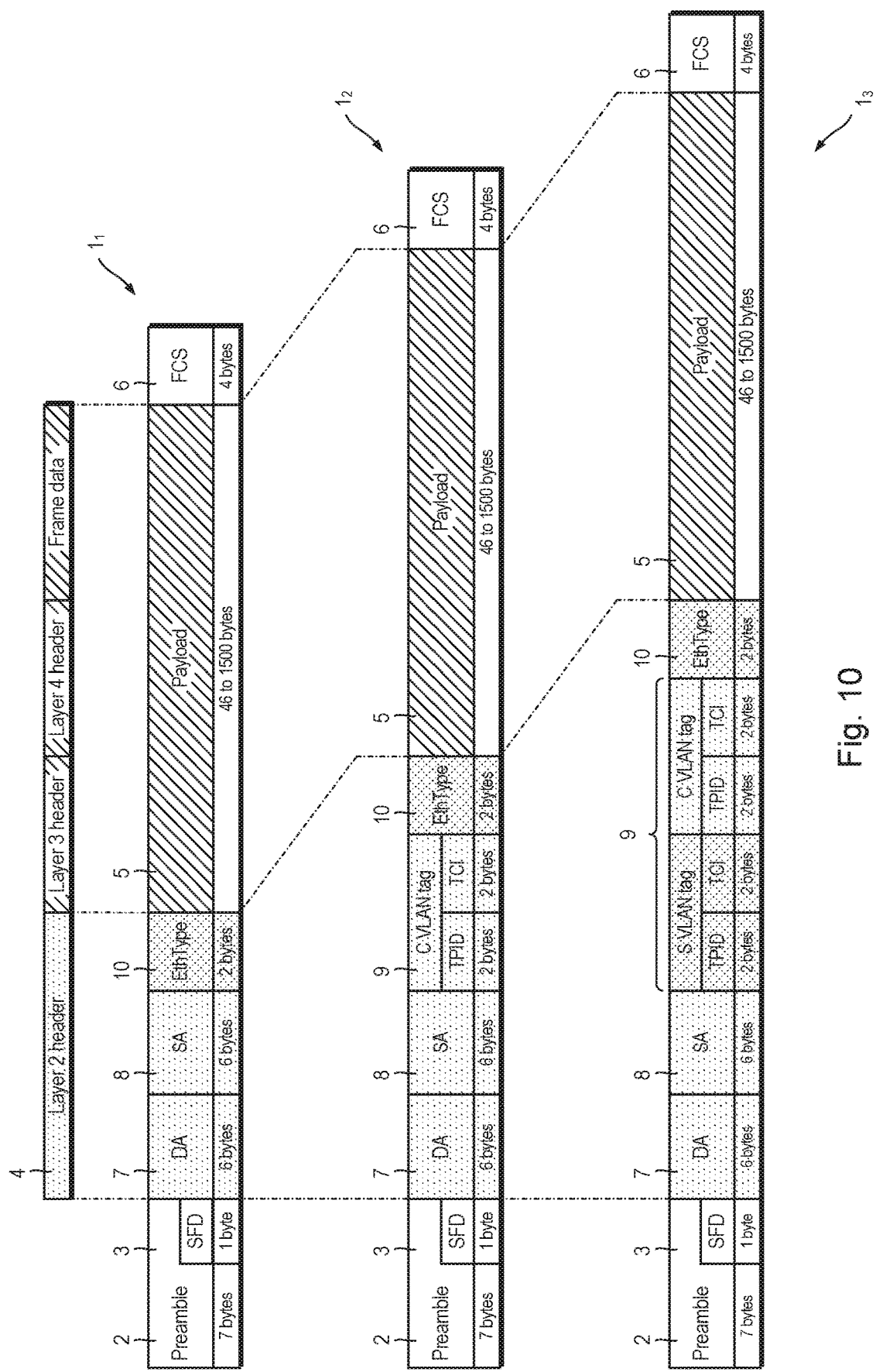
FIG. 10 illustrates an untagged Ethernet frame, a single-tagged Ethernet data frame and a double-tagged Ethernet data frame.

Referring to FIG. 10, first, second and third Ethernet frames $1_1$, $1_2$, $1_3$ are shown.

The first Ethernet frame $1_1$ is an untagged Ethernet frame having an IEEE 802.3 frame structure in which the 16-bit EtherType field 10 follows directly after the Source MAC address 8. The EtherType field 10 is used to indicate which protocol is encapsulated in the payload of the frame. For IPv4, EtherType=0x0800 and, for IPv6, EtherType=0x86DD.

The second and third Ethernet frames $1_2$, $1^3$ support virtual LANs (VLANs) and conform to IEEE 802.1Q. In the second Ethernet frame $1_2$, a 32-bit VLAN header is added immediately after the source MAC address 8 thereby shifting the EtherType field 10 by 4 bytes. In the third Ethernet frame $1_3$, two VLAN headers are added (referred to as "double-tagging"). A 32-bit service tag (S-VLAN tag) is added immediately after the source MAC address 8 followed by a 32-bit customer tag (C-VLAN tag) thereby shifting the EtherType field 10 by 8 bytes.

An Ethernet frame can be used to transmit data as User Datagram Protocol (UDP) datagrams or in Transmission Control Protocol (TCP) segments transferred via Internet Protocol version 4 (IPv4) or Internet Protocol version 6 (IPv6).

Figure 11:
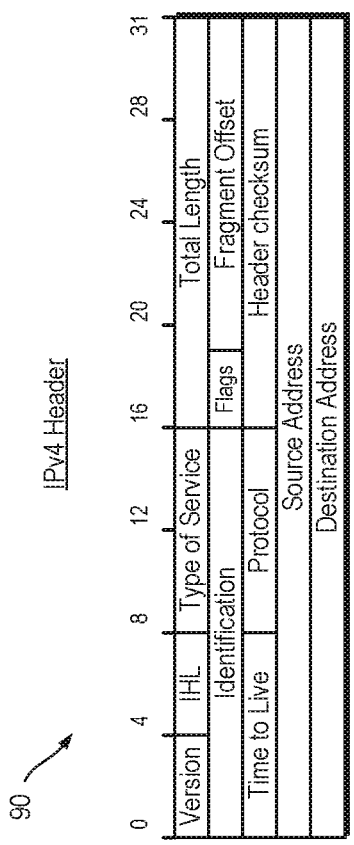
FIG. 11 illustrates an IPv4 header.
Figure 12:
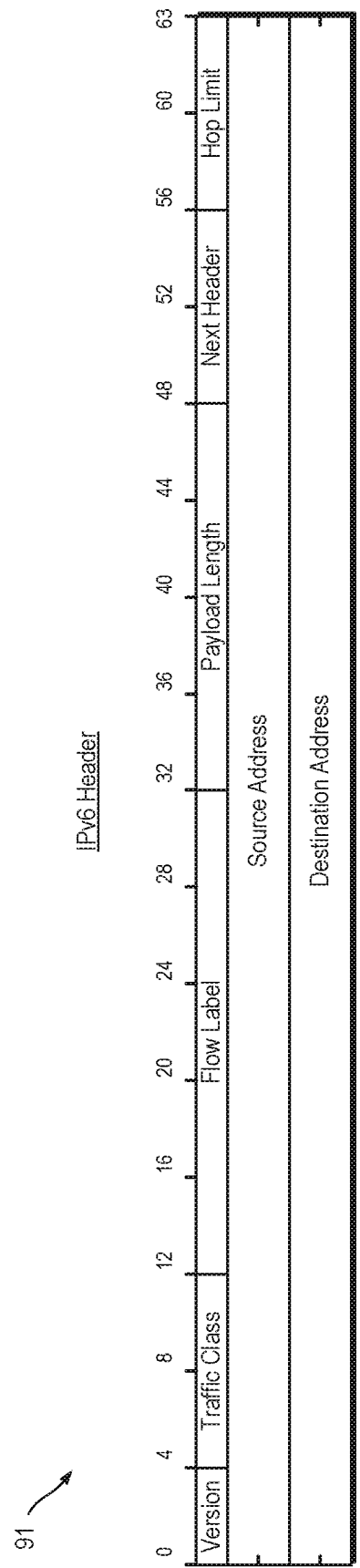
FIG. 12 illustrates an IPv6 header.

Referring to FIGS. 11 and 12, an IPv4 header 90 and an IPv6 header 91 are shown.

Referring in particular to FIG. 11, the IPv4 header consists of 20 bytes and has 12 fields including Version (i.e., b0100), IP Header length (IHL), Type of Service, Total Length (i.e., the size of the datagram including the header and payload), Identification, Flags, Fragment Offset, Time to Love (TTL), Protocol (e.g., 6 indicates TCP and 17 indicates UDP), Header Checksum, Source Address (i.e., the IP address of the sending node) and Destination Address (i.e., the IP address of the intended receiving node).

Referring in particular to FIG. 12, the IPv6 header consists of 40 bytes and has eight fields including Version (i.e., b0110), Traffic Class, Flow Label, Payload Length, Next Header which species the type of header (and uses the same scheme used in the Protocol field in IPv4), Hop Limit (which replaces the TTL field in IPv4), Source Address (i.e., the IP address of the sending node) and Destination Address (i.e., the IP address of the intended receiving node).

The classification unit 23 can be adjustably configured to check multiple fields to identify EtherType (i.e., IPv4 or IPv6) and Protocol or Next Header (i.e., UDP or TCP).

Variability in the position of the EtherType field can be accommodated by using a dynamic offset which can set according to whether an IEEE 802.1Q header is used or not used.

EtherType

EtherType can be analysed by a 2-byte configurable comparator unit 32. This could be achieved, for example, using two comparator units 32 operating in precise mode. This, however, can be considered to be an unnecessary overhead since offset may not be needed, offset multiplexing can be computationally expensive and logic for different modes is not required. Thus, a block comparator unit 34 for inspecting the EtherType field and, optionally, Protocol/Next Header fields can be used. Herein, such as block comparator unit 34 is referred to as an "Ethernet block comparator unit 34". In addition to checking EtherType, the Ethernet block comparator unit 34 can also check the Protocol field and/or the Next Header field.

As explained earlier, reference values in a comparator unit may be configurable, i.e., values stored in registers may be configurable, or fixed. Given that the pool of potential values for EtherType and Protocol field and/or the Next Header field is small, then at least some of the values in the Ethernet block comparator units 34 can be fixed.

Figures 13, 14:
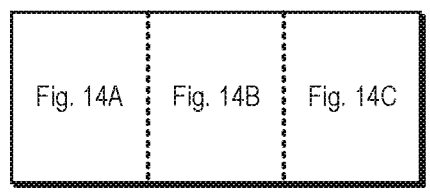
FIG. 13 is a table which illustrates different modes of filtering based on EtherType.
FIG. 14 is table illustrating different filter fields.

Referring to FIG. 13, the Ethernet comparator unit 34 includes registers 62 (FIG. 5) which may store values of EtherType, for example, 0x0806 for Address Resolution Protocol (ARP), 0x0800 for IPv4, 0x08DD for IPv4, and values of Protocol and Next Header, for instance 0x06 for TCP and 0x11 for UDP. FIG. 13 shows a table 92 listing types of header, the EtherType value and a description of the corresponding protocol.

For Ethernet protocols, the number of fields (and, thus, offset values) is limited and so the classification keys tend to be limited, focussing mainly on, for example, 1722 Stream ID, IPv4 address and MAC address. Accordingly, EtherType can be particularly useful for frame type identification and using dedicated logic, for example in the form of an Ethernet block comparator 34, which consumes less area, can be useful.

Filter Fields Examples

Referring to FIG. 14, a table 97 is shown which lists different types of frames and five different types of filters, i.e., five differently configured comparator units 32, 33, 34.

Frame types include IEEE 802.1AS network control traffic such as gPTP or SPR, Address Resolution Protocol (ADP), Link Layer Discovery Protocol (LLDP), IEEE 1722, IPv4, TCP/IPv4, UDP/IPv4, SOME/IPv4, ICMP/IPv4, IPv6, TCP/IPv6, UDP/IPv6, SOME/IPv6, ICMP/IPv6, Double tagged and Null Stream Identification for FRER (IEEE 802.1CB).

As shown in FIG. 14A, a first filter (for example, a first configurable comparator unit 32), Input_0, can inspect protocol (PROT) and EtherType (TYPE) fields and a specific frame-type filter bit.

As shown in FIG. 14A, a second filter (for example, a second configurable comparator unit 32), Input_1, can inspect four bytes using a reference value and an optional mask, in either precise or expand mode.

As shown in FIG. 14B, a third filter (for example, a third configurable comparator unit 32), Input_2, can inspect four bytes using a reference value and an optional mask, in either mask, precise or expand mode.

As shown in FIG. 14B, a fourth filter (for example, a fourth configurable comparator unit 32), Input_3, can inspect four bytes using a reference value and an optional mask, in either precise or expand mode.

As shown in FIG. 14C, a fifth filter (for example, a fifth configurable comparator unit 32), Input_4, can inspect two bytes using the VLAN C tag, a fixed mask of x000F and a mask in mask mode.

In FIG. 14 and FIGS. 14A-14C, i is the index of the matching filter. The index number depends upon software configuration of the Filter Type. Text fields in grey italics are redundant checks.

For example, for TCP/IPv4:
Input_0: PROT=1, TYPE=0xXX06 and specific frame-type filter bit is i;
Input_1: Reference values is IPv4 Address, Mask is No, and Mode is Precise;
Input_2: Reference value is Port, Mask is No, and Mode is Precise;
Input_3: Not used
Input_4: Reference value is VLAN C tag, Mask is 0x000F, and Mode is Mask;
For example, for TCP/IPv6:
Input_0: PROT=2, TYPE=0xXX06 and specific frame-type filter bit is i;

Input_1: Reference values is IPv6 Address, Mask is IPv6 Address, and Mode is Expand;
Input_2: Reference value is Port, Mask is No, and Mode is Precise;
Input_3: Reference values is IPv6 Address, Mask is IPv6 Address, and Mode is Expand;
Input_4: Reference value is VLAN C tag, Mask is x000F, and Mode is Mask;

Thus, in relation to TCP/IPv4 and TCP/IPv6, depending upon whether a node is server or client, either Destination or Source IP address and port values is used.

Matching Unit 36

Referring again to FIG. 4, the matching unit 36 includes a crossbar block 37 and a cascade 38.

Figure 15:
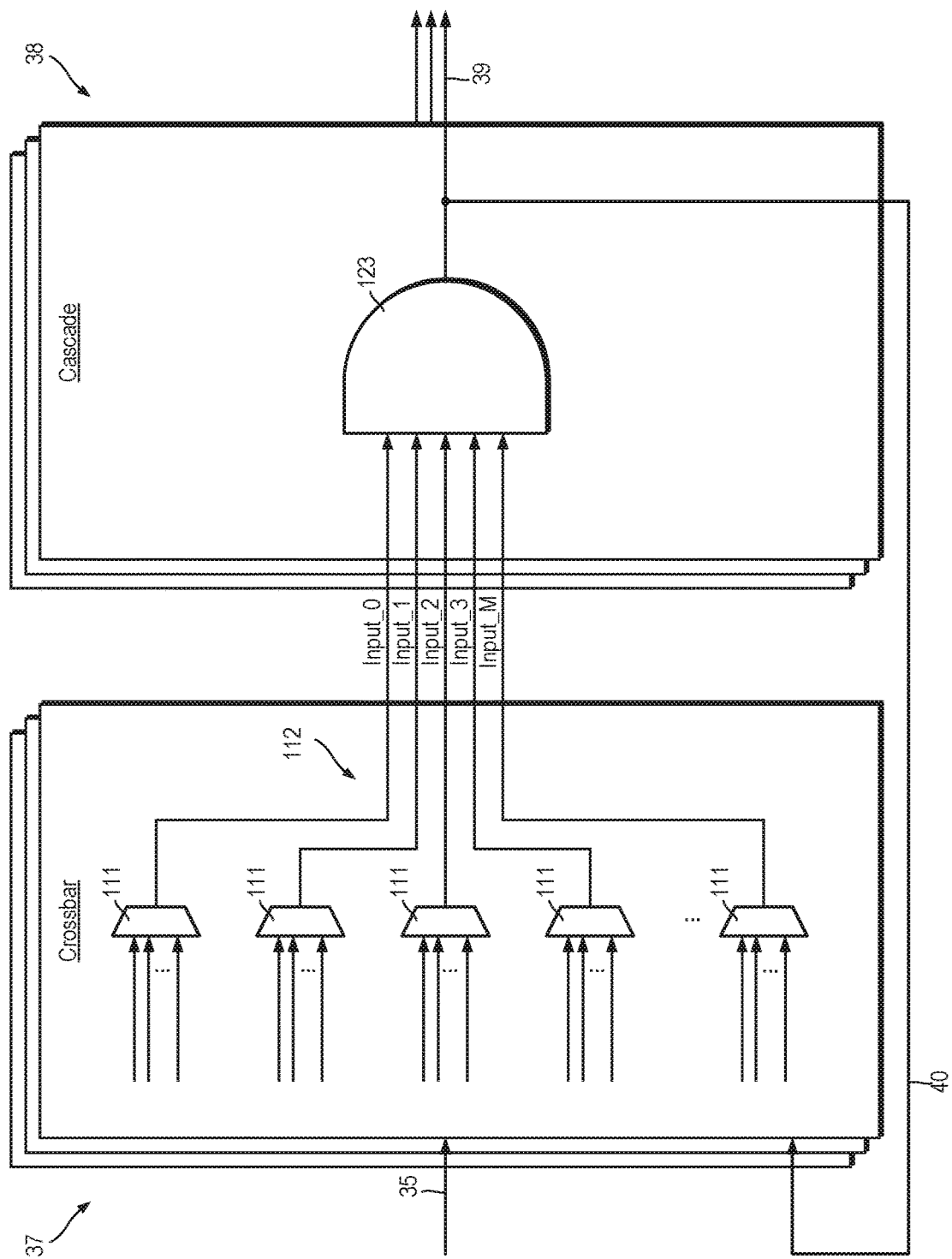
FIG. 15 is a block diagram of an identification stage including a crossbar and cascade.

Referring also to FIG. 15, the crossbar block 37 comprises M multiplexers 111 (where M is a positive, non-zero integer) each able to select one of N matches (where N is a positive, non-zero integer), i.e., one of N outputs 35 from the comparator units 32, 33, 34, and to provide this as an input Input_0, Input_1, ..., Input_M to an AND gate 123. This arrangement is repeated U times (where U is a positive, non-zero integer). One of the inputs to the multiplexers 111 may include one or outputs 39 from one or more AND gates 123 as a reusable result 40. Additionally or alternatively, OR gates (not shown) can be used receiving, for example, outputs 35 of the comparator units 32, 33, 34 and/or one or more results 40 from the cascade 38.

Figure 16:
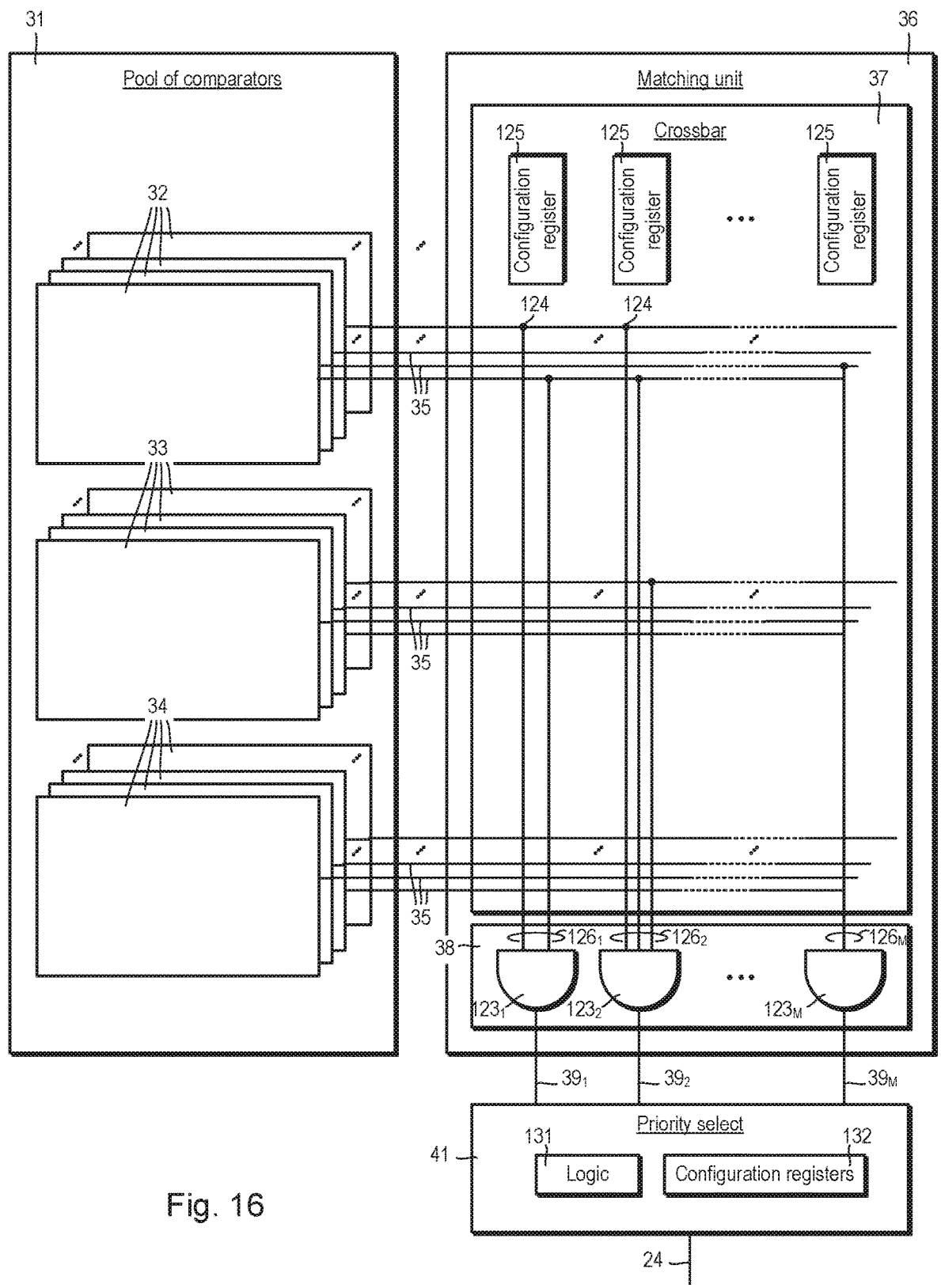
FIG. 16 is a schematic block diagram of a classification unit.

Referring also to FIG. 16, the comparator pool 31, matching unit 36 and priority select unit 37 are shown in a different way.

As shown in FIG. 16, the crossbar block 37 (or "crossbar switch") provides junctions 124 (or "interconnects") between comparator units 32, 33, 34 and the AND gates 123. The junctions 124 are configurable via configuration registers 125.

Each AND gate $123_1$, $123_2$, ... $123_M$ is supplied with a respective set of crossbar outputs $126_1$, $123_2$, ..., $126_M$. Each set of crossbar outputs $126_1$, $123_2$, ..., $126_M$ may comprise zero, one, two, three or more crossbar outputs which are coupled to a comparator unit output 35.

Although not shown in FIG. 16 for clarity, an output $39_1$, $39_2$, ..., $39_M$ from one or more AND gates $123_1$, $123_2$, ... $123_M$ can be brought back as inputs to the crossbar block 37. This can allow the number of crossbar inputs to be reduced. For example, it is possible to pre-qualify all traffic for a given UDP destination port and use the second round in crossbar to distinguish the possible sources, such as source IP and source port.

For a 1-Gbps link, the minimum event rate is 700 ns. When running the filter 21 (FIG. 3) at 100 MHz, there are about 70 clock cycles which can be used to pipeline complete filtering.

Referring still to FIG. 16, the priority select unit 41 comprises logic 131 and configuration registers 132.

The priority select unit 41 can implement a strict priority scheme. For example, a simple implementation can be used which prioritises output according to the output of the cascade 38. Thus, the first output (identification number 0) has the highest priority, whereas the last output (identification number U) has the lowest priority.

For example, three comparator units 32, 33, 34 can be used to identify (a) IPv4 destination address, (b) IP protocol as TCP and (c) TCP destination port as 80. Three AND gates 123 ("cascades") can be used, namely (I) a+b+c, (II) a+b and (III) a only.

In the priority select unit 41, the cascades 123 can be ordered in a way that cascade I has highest priority (#0), and cascade III has the lowest priority (e.g., #2). Thus, according to hierarchical sorting, the three types of frames are sorted in the following order, namely:

frames for TCP port 80 (which are priority #0) using classification number I and might be forwarded, for instance, to a DMA channel (not shown) for a web server (not shown);

remaining TCP frames (which are priority #1) using classification number II and might be forwarded, for instance to a DMA channel (not shown) for the TCP stack (not shown); and all other IPv4 frames (which are priority #2) using classification number III and might be forwarded, for instance, to a DMA channel (not shown) for the standard IP stack (not shown).

A chain translation can be used which employs a table of numbers to translate between U and an output priority V.

Priority selection allows simple coding of hierarchical conditions, as described earlier. In the case of IPv6 traffic, based on classification number, frames can be forwarded to its own DMA channel or, as per configuration in chain selection, to the DMA channel for the web server (same target as IPv4).

Figure 17:
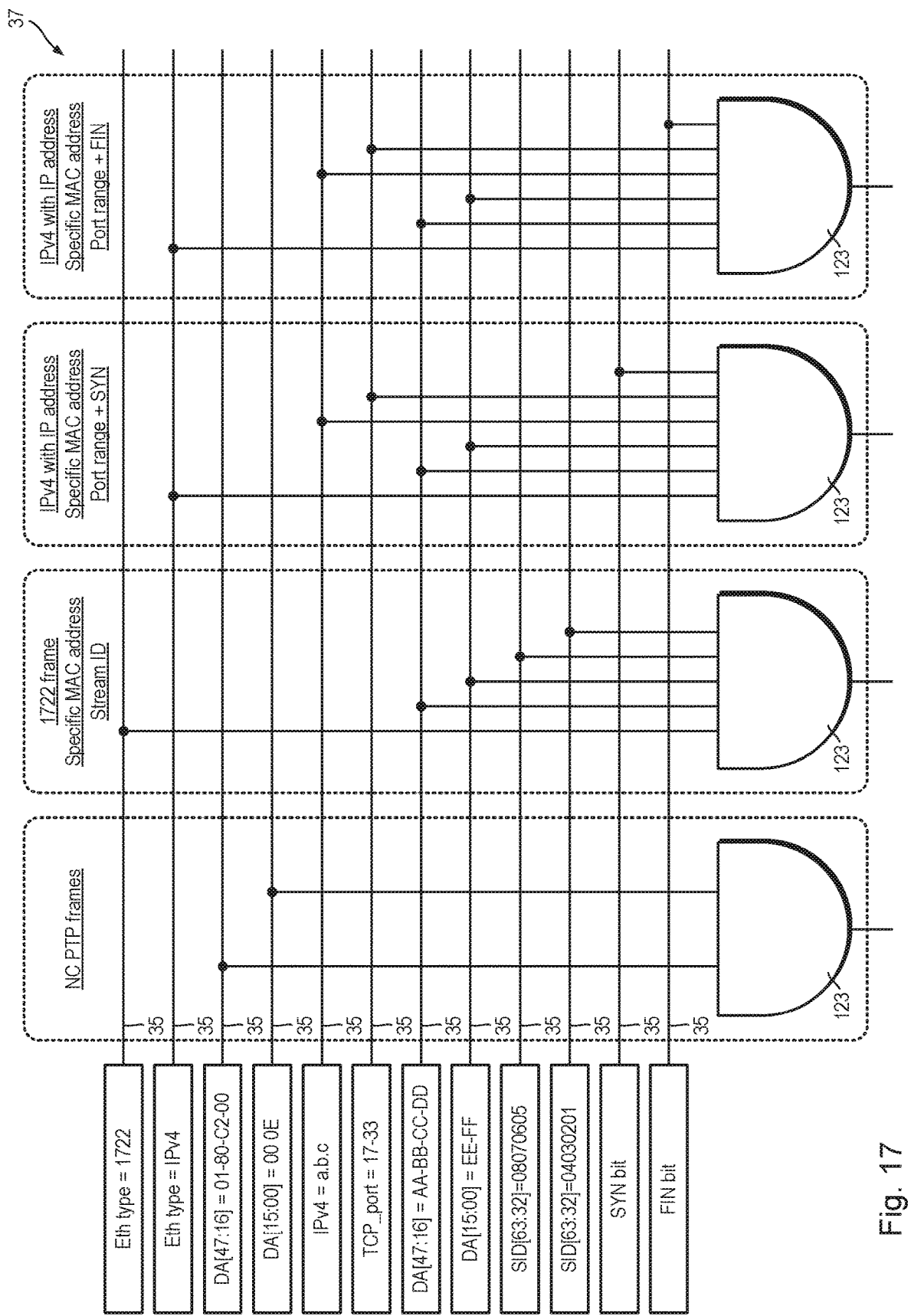
FIG. 17 is a block diagram of an example of crossbar and cascade.

FIG. 17 shows configuration of the crossbar 37 for some of the frame types shown listed in table 97 (FIG. 14).

Referring to FIGS. 14 and 17, the same output 35 can be used to identify different frames.

Figure 18:
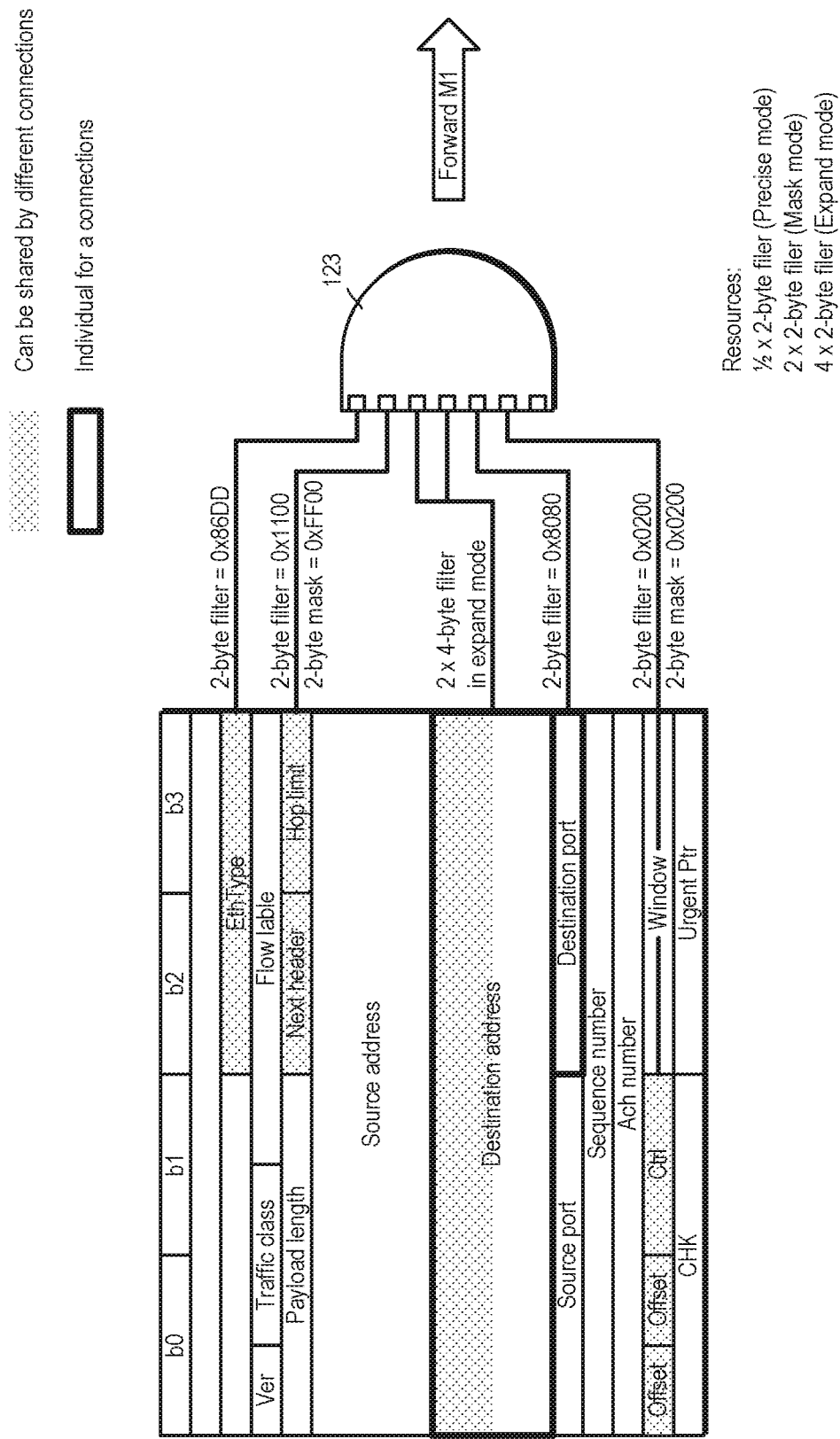
FIG. 18 illustrates a dedicated filter for TCP session requests.

Referring to FIG. 18, an example of a dedicated filter 21 (i.e., a configured filter 21) for TCP session requests is shown. In this example, the filter 21 is configured to catch a synchronise request (or "SYN request") sent by a client (not shown).

The filter 21 can be set by examining:
EtherType field with a 2-byte filter using 0x08DD as a reference;
Next header and hop limit fields with a 2-byte filter using 0x1100 as a reference and 0xFF00 as a mask;
Destination address with two 4-byte filters in expand mode;
Destination port with a 2-byte filter using 0x8080 as a reference; and
Offset and control fields with a 2-byte filter using 0x0200 as a reference and 0x0200 as a mask.

The destination address and the destination port are unique for flow control in a virtual machine (VM) (not shown). Once a match has been found, VM configures filtering for the connection.

In this example, the "always present" entry for "TCP SYN" triggers management software (not shown). The management software (not shown) checks if the TCP connection is OK. If yes, the management software (not shown) configures a lower prior filter for this TCP connection. When a frame with "TCP FIN" appears, this again goes to the management software (not shown), which removes the TCP connection from filter.

Offset (More Detailed)

Figure 19:
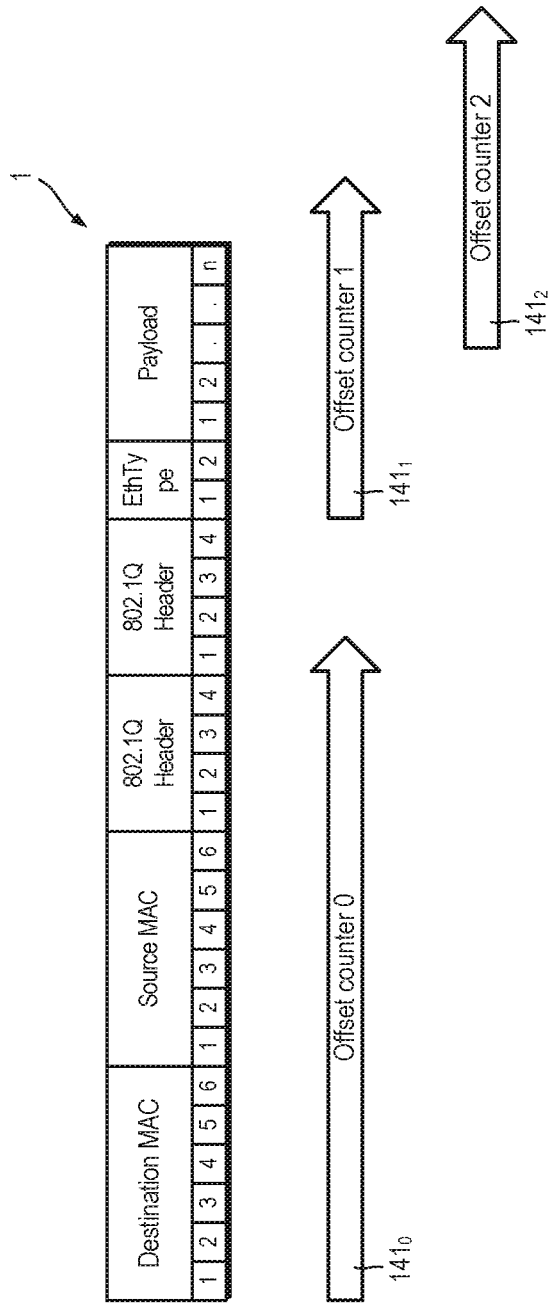
FIG. 19 illustrates filter offsets for three different types of frames.

Referring to FIG. 19, using different offset references 1410, 1411, 1412, filter programming can be simplified for the use case. For example, a first offset counter 1411 hides the optional 802.1Q header and a second offset counter 1412 could be start at IPv4/IPv6 payload to hide optional IP headers.

Figure 20:
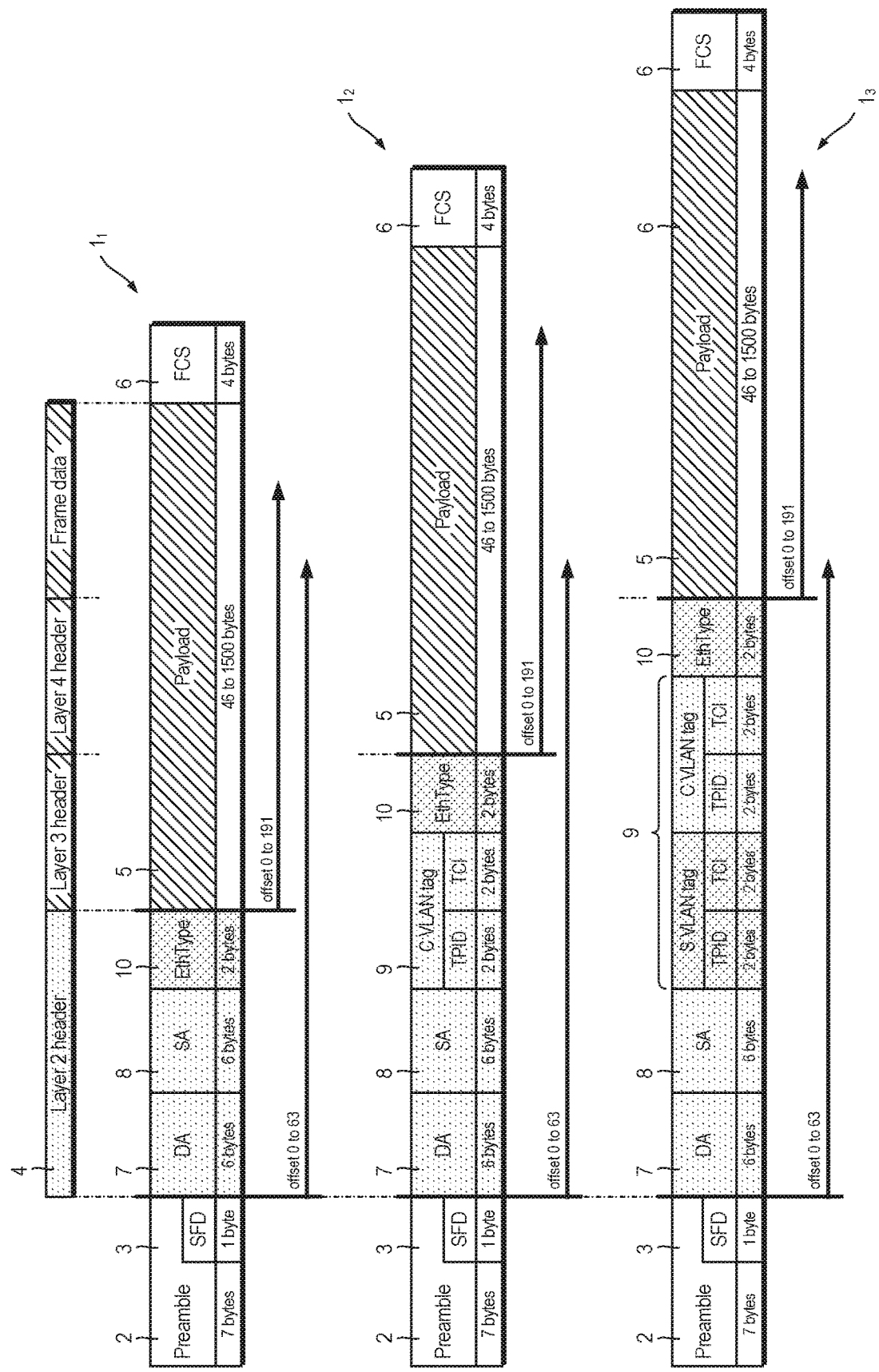
FIG. 20 illustrates different offsets for selecting or hiding layer 2 and/or layer 3 headers.

Referring to FIG. 20, untagged, single-tagged and double-tagged Ethernet frames 11, 12, 13 are again shown.

Distinction between fields before and after the EtherType field 10 is helpful as it can compensate for the existence of the VLAN tag 9 existence during offset calculation. Distinguishing between layer 2 and layer 3 offset can be done through dedicated configuration or by using a programmed offset value.

Figure 21:
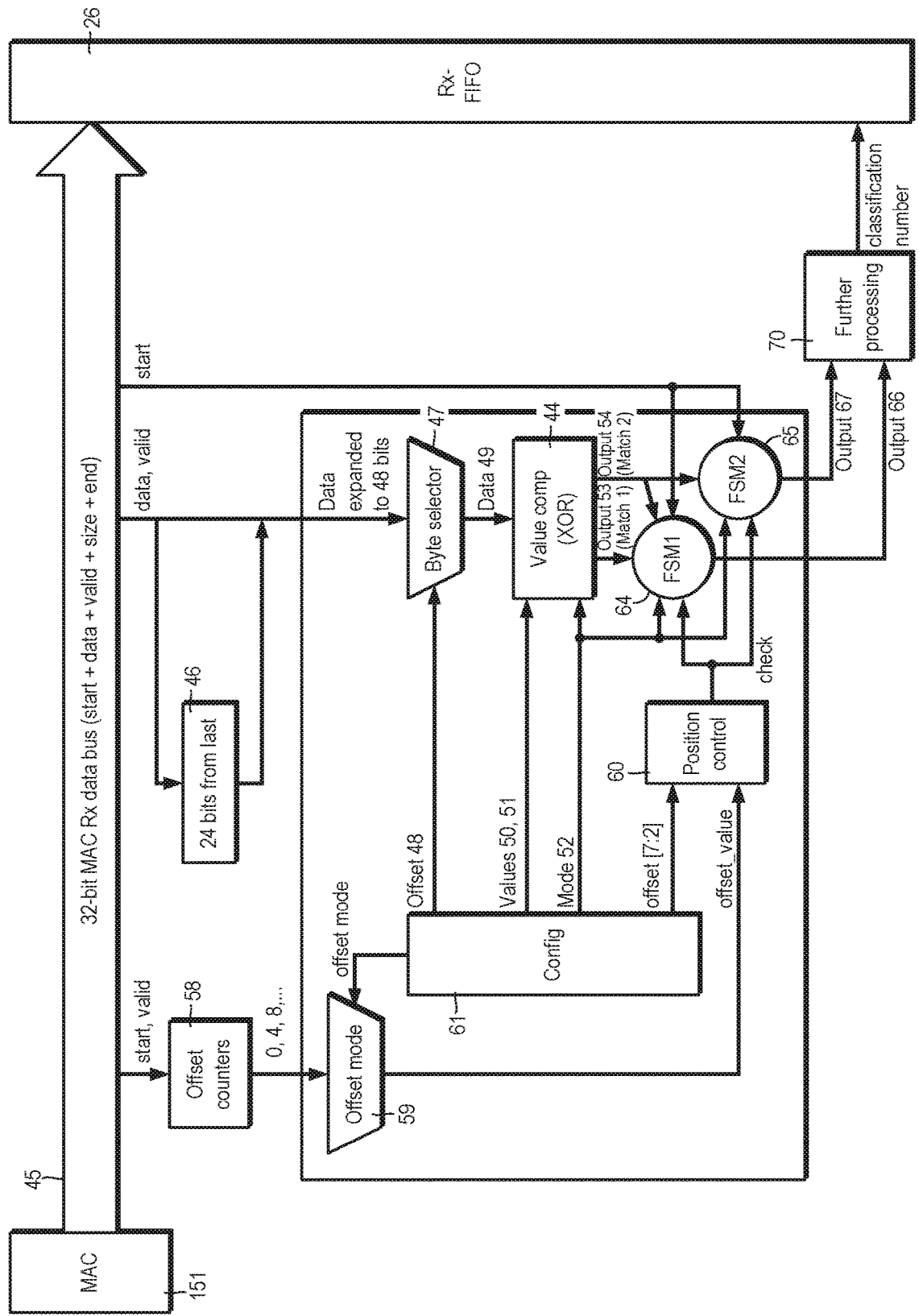
FIG. 21 is a schematic block diagram of a configurable comparator unit which includes a value comparator and at first and second FSMs.

Referring to FIG. 21, an Ethernet MAC 151 typically provides the receive data in serial form, for instance in blocks of 32-bit data words (with size information if the frame size is not a multiple of 4 bytes).

A comparator can take two approaches to filtering such data.

In a parallel approach, all data that is potentially needed for the comparator is provided in parallel. This approach needs sufficiently large storage, such as 1024 flops for a 128-byte offset area. This approach uses byte offset selector logic using N-times 128 to one multiplexer for a N-bit comparator as each byte offset is valid.

In a sequential approach, data is compared on a serial receive data stream, for example, on chunks of data (a data word) provided by the MAC 151. An FSM used to identify the relevant parts in frame. In this approach, byte offset selector is limited to positions inside the data word.

This can be achieved either by shifting/splitting the value to fit to the byte position inside the frame ("filter checked sequential") or by expanding the receive data to the width of the comparator.

Figure 22:
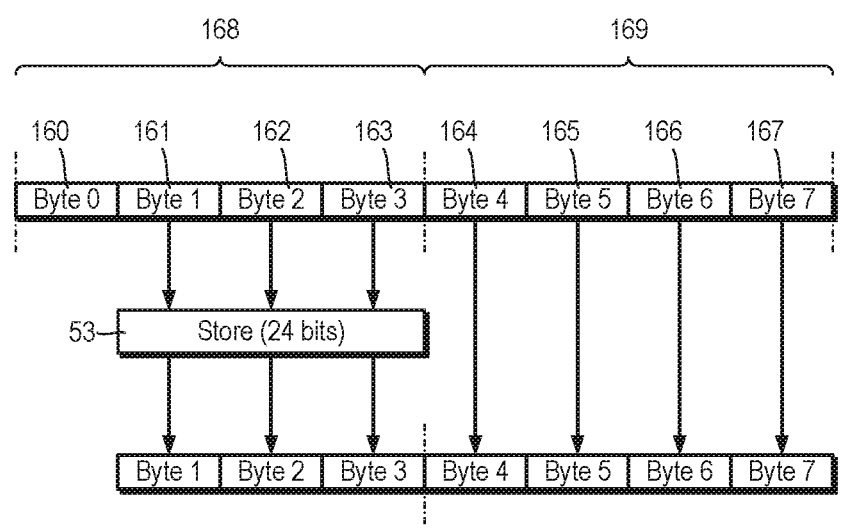
FIG. 22 illustrates use of a store in the configurable comparator unit shown in FIG. 21.

Referring also to FIG. 22, byte extraction using a mixture of the two approaches is used. The comparator is expanded by B−1 bytes (where B is 4 for a 32-bit MAC data bus) to simply byte offset handling. Comparator with greater than B is handled sequentially (e.g., 64-bit comparator on 32-bit MAC data bus).

Configurable Comparator Unit 32 (More Detailed)

Referring to FIG. 21, a 32-bit configurable comparator unit 32 is shown in more detail.

Frame data are forwarded by MAC 151 on arrival to buffer 26 via a data bus 45.

Referring also to FIG. 22, the data bus 42 is 32-bit wide and so 8-bit data bytes 160, 161, . . . , 167 are grouped into 32-bit blocks 168, 169. To allow processing of, for example, 2-bytes of data which bridge adjacent blocks 168, 169, a buffer 46 can store the last three bytes from a previous block 168. This can allow data to be expanded to 48 bits.

Referring again to FIG. 21, a byte selector 47 selects which bytes of the expanded data to pass to the value comparator 44 based on an offset defined in configuration 61. Configuration 61 pass a reference value and an optionally mask to the value comparator 44. Configuration 61 also sets mode (e.g., mask, expand, precise) which passed to the value comparator 44 and the FSMs 64, 65. Offsets are handled by offset counters 57, offset mode controller 59 and position control 60 according to configuration 61.

In expand mode, position control 60 checks byte position P and byte position P+1. In other the other two modes, position control 60 only checks byte position P.

As explained hereinbefore, a value comparator 44 receives N-bytes data 49 and performs a comparison using two N-byte values (for instance, where N=2).

The first output 53 of the value comparator 44 is supplied to a first, three-state FSM 64 and the second output 54 of the value comparator 44 is supplied to each of the first, three-state FSM 64 and a second, two-state FSM 65.

Figure 23:
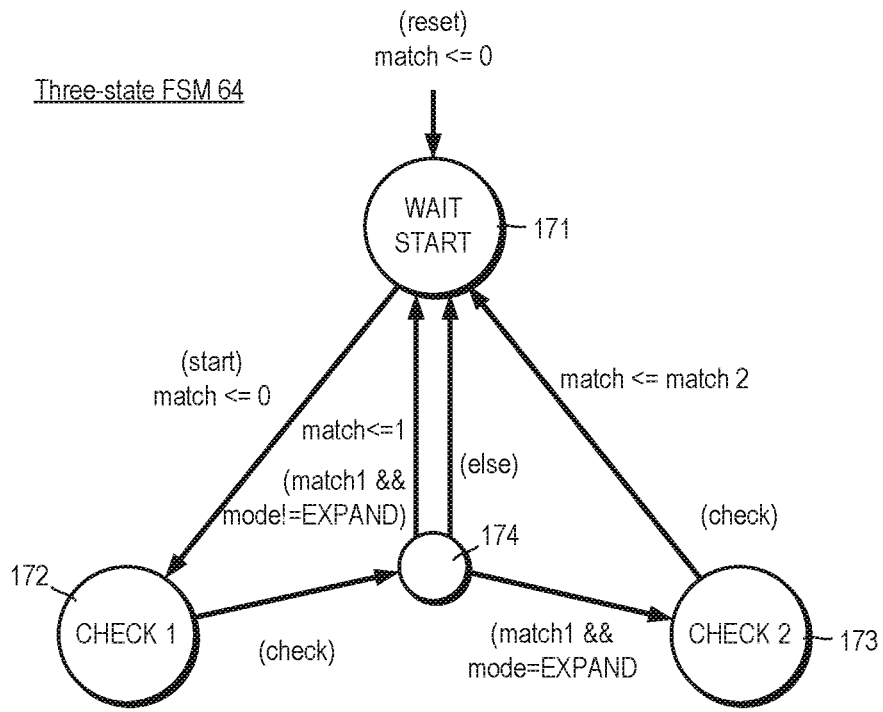
FIG. 23 is state diagram of the first FSM shown in FIG. 21.

Referring to FIG. 23, the three-state FSM 64 includes first, second and third states 171, 172, 173 and a decision point 174 (or "check point").

Following a RESET, the FSM 64 enters the first state 171 (or "WAIT state"). In response to detecting a start of frame ("start"), the FSM 64 changes to the second state 172 ("CHECK 1"). Match1 is used to decide how to proceed after the check point 174.

At the checkpoint, if the first value comparator output 53 is set to '1' (i.e., there is a match) AND the mode is NOT EXPAND, then the first FSM output 66 is set to '1', otherwise it is kept as '0'.

At the checkpoint, if the first output 53 is set to '1' (i.e., there is a match) AND the mode is EXPAND, then the FSM 64 changes to a third state 174 ("CHECK 2"). When the next N bytes are received, another check is performed on match2 and the first FSM output 66 depends on whether the second value comparator output 54 is set to '1' or '0' and returns to the first state 171 (i.e., WAIT state).

Figure 24:
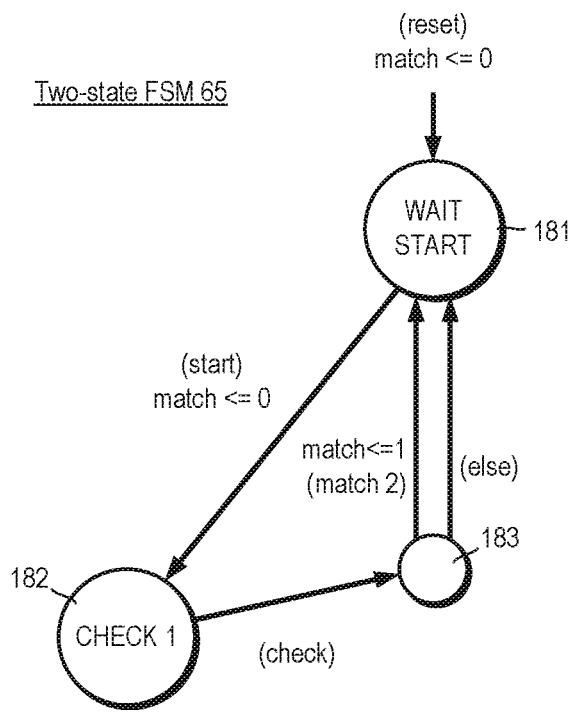
FIG. 24 is a state diagram of the second FSM shown in FIG. 21.

Referring to FIG. 24, the two-state FSM 65 includes first and second states 181, 182 and a check point 183.

Following a RESET, the FSM 65 enters the first state 181 (or "WAIT state"). In response to detecting a start of frame ("start"), the FSM 65 changes to the second state 182 ("CHECK 1").

At the checkpoint, if the second value comparator output 54 is set to '1' (i.e., there is a match), then the second FSM output 67 is set to '1', otherwise it is kept as '0'.

Implementation of a block comparator unit 34 (FIG. 4) is similar to that of a configurable comparator unit 32 except that for B reference values and thus B value comparators 44' (FIG. 8) and B outputs, there are B two-state FSMs 65 and B match outputs 71 to further processing 70. As block comparators 34 do not have an expand mode, only the simple two-state FSM 65 is required.

Integrated Circuit

Figure 25:
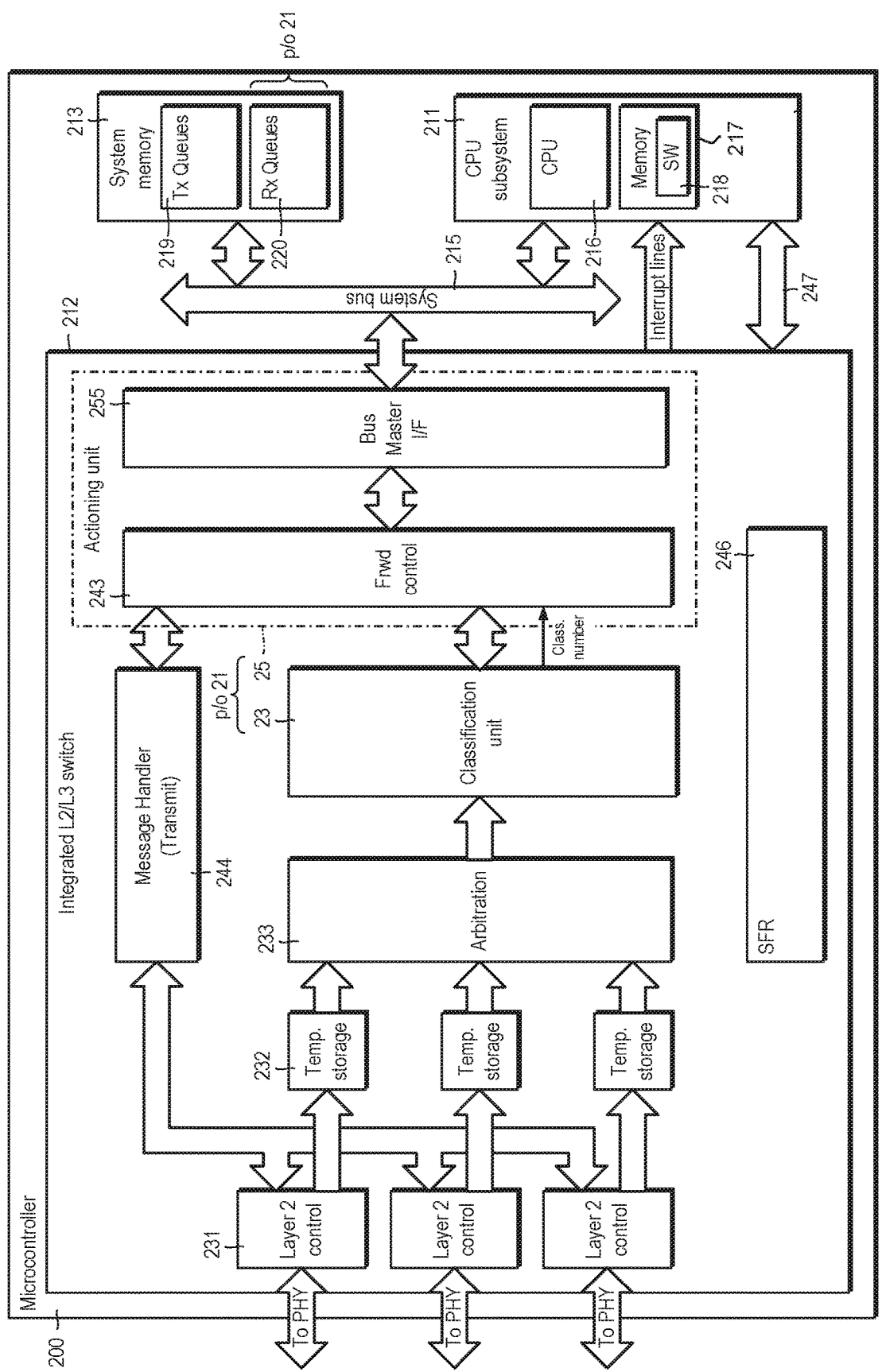
FIG. 25 is a block diagram of a microcontroller.

Referring to FIG. 25, an integrated circuit 200 in the form of a microcontroller is shown.

The microcontroller 200 includes the CPU sub-system 211, an integrated level 2 and level 3 switch 212 and system memory 213 interconnected by a system bus 215. The CPU sub-system 211 includes one or more CPUs 216 (herein, for clarity, reference will be made to a CPU 216) and memory 217 storing application software 218. The CPU 216 loads and executes the application software 218. The system memory 213 is used to store data in transmit queues 219 and receive queues 220.

Referring still to FIG. 25, the switch 212 includes layer 2 controller 231 (e.g., media access controllers) and corresponding temporary storage 232. In some cases (for example, where the integrated layer 2 and layer 3 device is not a switch, but instead an end station) there may be only one layer 2 controller and one temporary storage 232. If there are multiple layer 2 controllers 231, then the switch 212 may include an arbitration unit 233 which feeds frames to the classification unit 23. The classification unit 23 is coupled to a forwarding control unit 243 which can pass received data to a transmit message handler 244 for suitable forwarding or to the bus master interface 255 for passing the received data to system memory 213. The forwarding control unit 243 and bus master interface 255 serve as the actioning unit 25.

The layer 2 controller/s is (are) connected to an external physical layer transceiver (PHY) (not shown) or internal (i.e., on chip) PHY module (not shown). The end switch 212 may have direct memory access capability and transfer data between a layer 2 controller 231 and system memory 213 without CPU intervention.

The switch 212 includes special function register (SFR) 246. The switch 212 is controlled by the CPU 216 by a peripheral bus interface 247 via the SFR 246.

Operation

Figure 26:
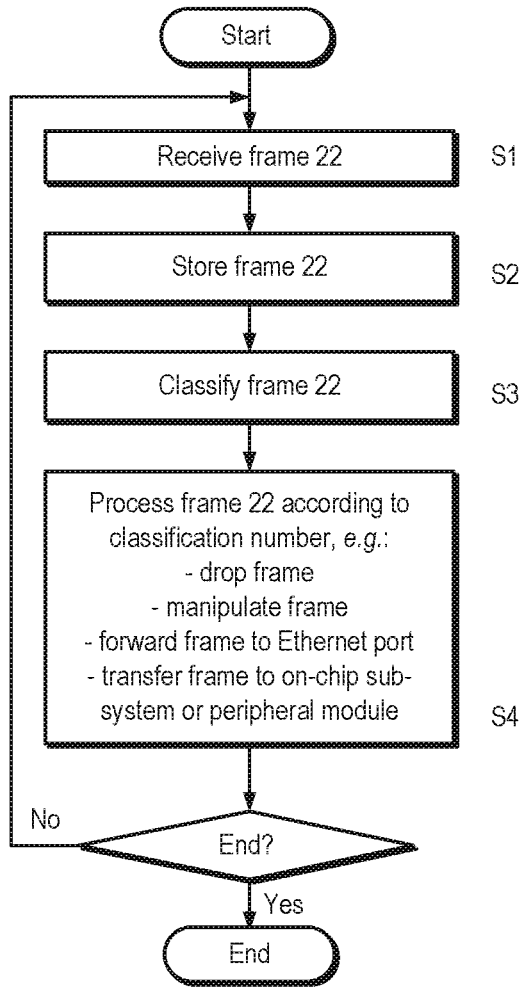
FIG. 26 is a process flow diagram of frame filtering.

Referring to FIGS. 4 and 26, operation of the filter 21 will now be described.

A frame 22 is received by the filter 21 (step S1). The frame 22 is stored in receive buffer 26 (step S2) and is classified by the classification unit 23 (step S3). The classification unit 23 outputs a classification number 24. The actioning unit 25 processes the frame 22 according to the classification number 24 (step S4). The actioning unit 25 may, for example, drop the frame, manipulate the frame, forward it to a port or transfer the frame to an on-chip sub-system or peripheral module.

Application

Figure 27:
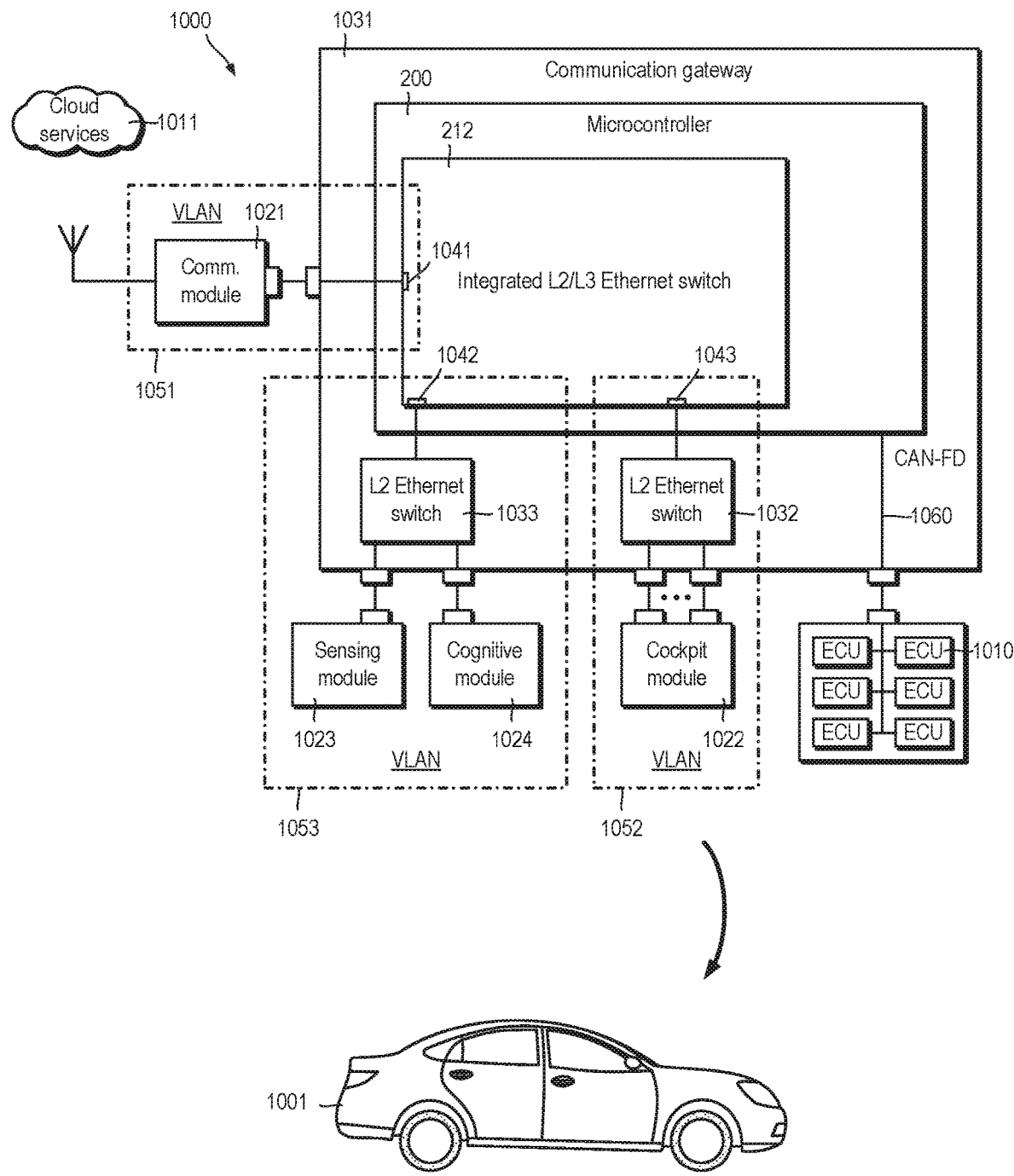
FIG. 27 schematically illustrates a motor vehicle which includes an integrated circuit which includes a frame filter.

Referring to FIG. 27, a communications system 1000 which is deployed in a vehicle 1001, such as a motor vehicle, is shown.

Network traffic is generally increased by the addition of ADAS electronic control units (ECUs) 1010 and new cloud services 1011. Thus, to help prevent unauthorized access, communications module 1021 and cockpit module 1022 on which third party applications (not shown) operate should be separated from the in-vehicle network modules 1023, 1024 and filter data appropriately.

The communications system 1000 includes a communication gateway 1031 which include a microcontroller 200 having an integrated Ethernet switch 212 providing a layer-2 ("L2") switch and layer-3 ("L3") routing, and L2 Ethernet switches 1032, 1033.

The switch 212 can have plural Gigabit Ethernet ports 1041, 1042, 1043 and provide VLAN tagging/untagging, MAC/IP address filtering and TCP/UDP port filtering.

FIG. 27 illustrates a configuration whereby the switch 212 is separate in-vehicle networks using VLANs 1051, 1052, 1053.

The integrated L2/L3 switch 212 is connected to the wireless communications module 1021 forming a first VLAN 1051. The integrated L2/L3 switch 212 may be connected via a first L2 Ethernet switch 1032 to the cockpit module 1022 via a second VLAN 1052. The switch integrated L2/L3 switch 212 may be connected via a third L2 Ethernet switch 1033 to a sensing module 1023 and a cognitive module 1024 via a third VLAN 1052. Meanwhile, the integrated L2/L3 switch 212 may be connected to ADAS electronic control units (ECUs) 1010 via CAN-FD network 1060.

Modifications

It will be appreciated that various modifications may be made to the embodiments hereinbefore described. Such modifications may involve equivalent and other features which are already known in the design, manufacture and use of communications network controller module and component parts thereof and which may be used instead of or in addition to features already described herein. Features of one embodiment may be replaced or supplemented by features of another embodiment.

The filter herein described can be included in integrated circuits other than microcontrollers and systems-on-a-chip (SoCs). For example, they can be used in application-specific ICs (ASICs).

The filter can be used in communication peripherals and be used in automotive, industrial and data centre applications. The communication protocols are not limited to Ethernet and CAN (FD, XL).

Although claims have been formulated in this application to particular combinations of features, it should be understood that the scope of the disclosure of the present invention also includes any novel features or any novel combination of features disclosed herein either explicitly or implicitly or any generalization thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

What is claimed is:

1. A circuit comprising:
   a plurality of comparator units, each comparator unit configured, in response to receiving at least a part of a data frame, to perform a determination of whether data in a portion of the data frame matches respective reference data and to provide a result to a comparator unit output based on the determination;
   a crossbar switch comprising crossbar inputs coupled to respective comparator unit outputs and configured to provide sets of crossbar switch outputs via configurable interconnects; and
   a set of result-combining logic units, each result-combining logic unit coupled to a respective set of crossbar switch outputs and configured to provide a respective logic unit output.

2. The circuit of claim 1,
   wherein at least one crossbar input is configurably provided to at least two of the result-combining logic units.

3. The circuit of claim 1,
   wherein at least one result-combining logic output is configurably provided as a crossbar input.

4. The circuit of claim 1,
   wherein the plurality of comparator units comprises a plurality of configurable comparator units operable in at least first and second modes which are selectable, wherein, in the first mode, the data portion is maskable with a mask.

5. The circuit of claim 4,
   wherein the plurality of configurable comparator units are operable to receive two sets of reference data and to perform the determination using both sets of reference data.

6. The circuit of claim 5,
   wherein the two sets of data are concatenated.

7. The circuit of claim 1,
   wherein at least some of the plurality of comparator units are arranged to apply an offset so as to select the portion of the data frame to be used in the determination.

8. The circuit of claim 1,
   wherein at least some of the plurality of comparator units comprise one or more finite state machines for processing a comparison of the portion of the data with reference data.

9. The circuit of claim 1,
   wherein the comparator units comprise at least one block comparator unit configured to compare the portion of the data frame with B sets of reference data, where B is a positive non-zero integer which is at least 4.

10. The circuit of claim 1,
    wherein the result-combining logic units are AND gates, OR gates or a combination of AND and OR gates.

11. A classifier comprising:
    the circuit of claim 1; and
    a priority select arranged to receive logic unit outputs from the circuit and to generate a classification number in dependence on the logic unit outputs.

12. A filter comprising:
the circuit of claim 1; and
an actioning unit configured to process the data frame independence upon on the logic unit outputs.
13. An integrated circuit comprising the filter of claim 12.
14. A system comprising:
a communication gateway comprising the integrated circuit of claim 13; and
at least one node in communication with the integrated circuit,
wherein the filter is arranged to receive frames from the at least one node and to process the frames in dependence on the logic unit outputs.
15. A vehicle comprising the system of claim 14.

* * * * *